US012706341B2

(12) United States Patent
Aguilar et al.

(10) Patent No.: US 12,706,341 B2
(45) Date of Patent: Aug. 11, 2026

(54) BATTERIES, BATTERY COMPONENTS, AND RELATED METHODS AND APPARATUS FOR MITIGATING A THERMAL RUNAWAY EVENT OF A BATTERY

(71) Applicant: Aurora Flight Sciences Corporation, Manassas, VA (US)

(72) Inventors: Charles Aguilar, Arlington, VA (US); Conor Gillespie, Manassas, VA (US); Arun Sivan, Lincoln, MA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 69 days.

(21) Appl. No.: 18/591,394

(22) Filed: Feb. 29, 2024

(65) Prior Publication Data

US 2024/0204283 A1 Jun. 20, 2024

Related U.S. Application Data

(62) Division of application No. 17/577,290, filed on Jan. 17, 2022, now abandoned.

(Continued)

(51) Int. Cl.

*H01M 50/291* (2021.01)
*H01M 10/04* (2006.01)

(Continued)

(52) U.S. Cl.

CPC ..... *H01M 50/291* (2021.01); *H01M 10/0481* (2013.01); *H01M 50/204* (2021.01);

(Continued)

(58) Field of Classification Search

None

See application file for complete search history.

(56) References Cited

U.S. PATENT DOCUMENTS

| | | | |
|---|---|---|---|
| 3,148,846 | A | 9/1964 | Newton |
| 3,840,009 | A | 10/1974 | Michaels |

(Continued)

FOREIGN PATENT DOCUMENTS

| | | | |
|---|---|---|---|
| CN | 203589146 | U | 5/2014 |
| CN | 112303308 | A | 2/2021 |

(Continued)

OTHER PUBLICATIONS

Machine translation of DE-2925248-A (Year: 1981).*

(Continued)

*Primary Examiner* — Gregg Cantelmo

(74) *Attorney, Agent, or Firm* — Hanley, Flight & Zimmerman, LLC

(57) ABSTRACT

Batteries, battery components, and related methods and apparatus for mitigating a thermal runaway event of a battery are disclosed. Examples disclosed herein include a battery including an enclosure defining a cavity, the enclosure including a first end wall and a second end wall opposite the first end wall, a battery cell disposed in the cavity of the enclosure, a load spreader disposed in the cavity of the enclosure, the load spreader spaced from the first end wall, the battery cell disposed between the load spreader and the second end wall of the enclosure, the load spreader at least partially compressing the battery cell between the load spreader and the second end wall.

20 Claims, 17 Drawing Sheets

Related U.S. Application Data

(60) Provisional application No. 63/172,458, filed on Apr. 8, 2021.

(51) Int. Cl.
*H01M 10/0525* (2010.01)
*H01M 50/204* (2021.01)
*H01M 50/233* (2021.01)
*H01M 50/242* (2021.01)
*H01M 10/613* (2014.01)
*H01M 10/625* (2014.01)
*H01M 10/6555* (2014.01)
*H01M 10/6557* (2014.01)

(52) U.S. Cl.
CPC ....... *H01M 50/233* (2021.01); *H01M 50/242* (2021.01); *H01M 10/0525* (2013.01); *H01M 10/613* (2015.04); *H01M 10/625* (2015.04); *H01M 10/6555* (2015.04); *H01M 10/6557* (2015.04); *H01M 2200/20* (2013.01); *H01M 2220/20* (2013.01)

(56) References Cited

U.S. PATENT DOCUMENTS

| | | | | |
|---|---|---|---|---|
| 4,364,532 | A | 12/1982 | Stark | |
| 4,415,133 | A | 11/1983 | Phillips | |
| 4,621,033 | A * | 11/1986 | Tsutsumi | H01M 8/247 429/452 |
| 4,661,758 | A | 4/1987 | Whittaker | |
| 5,105,088 | A | 4/1992 | Boniface | |
| 5,585,204 | A | 12/1996 | Oshida | |
| 5,670,272 | A | 9/1997 | Cheu | |
| 5,710,503 | A | 1/1998 | Sideris | |
| 5,810,284 | A | 9/1998 | Hibbs | |
| 6,040,085 | A | 3/2000 | Cheu | |
| 6,045,089 | A | 4/2000 | Chen | |
| 6,174,595 | B1 | 1/2001 | Sanders | |
| 6,368,743 | B1 | 4/2002 | Guerin | |
| 6,430,692 | B1 | 8/2002 | Kimble | |
| 6,624,535 | B2 | 9/2003 | Morrow | |
| 7,075,194 | B2 | 7/2006 | Weidenheimer | |
| 7,270,295 | B2 | 9/2007 | Bennett | |
| 7,278,607 | B2 | 10/2007 | Fuller | |
| 8,356,770 | B2 | 1/2013 | Parks | |
| 8,507,125 | B2 | 8/2013 | Meschter | |
| 8,717,187 | B2 | 5/2014 | Lockwood | |
| 8,846,231 | B2 | 9/2014 | Buck et al. | |
| 8,937,254 | B2 | 1/2015 | Wen | |
| 9,054,361 | B2 | 6/2015 | Christian | |
| 9,197,081 | B2 | 11/2015 | Finberg | |
| 9,478,836 | B2 | 10/2016 | Albertus | |
| 9,508,970 | B2 | 11/2016 | Jones | |
| 9,525,290 | B2 | 12/2016 | Snyder | |
| 9,531,039 | B2 | 12/2016 | Heubner | |
| 9,705,156 | B2 | 7/2017 | Dorsch | |
| 10,148,121 | B2 | 12/2018 | Ehrmantraut | |
| 10,554,073 | B2 | 2/2020 | Ehrmantraut | |
| 11,108,251 | B2 | 8/2021 | Kirleis et al. | |
| 11,133,534 | B2 | 9/2021 | Kirleis et al. | |
| 11,728,661 | B2 | 8/2023 | Kirleis et al. | |
| 2004/0021442 | A1 | 2/2004 | Higashino | |
| 2004/0138785 | A1 | 7/2004 | Emori | |
| 2005/0146816 | A1 | 7/2005 | Nguyen | |
| 2005/0258306 | A1 | 11/2005 | Barocela | |
| 2006/0134514 | A1 | 6/2006 | Lenain et al. | |
| 2007/0062744 | A1 | 3/2007 | Weidenheimer | |
| 2008/0143292 | A1 | 6/2008 | Ward | |
| 2008/0213659 | A1 | 9/2008 | Yamada | |
| 2008/0215200 | A1 | 9/2008 | Toth | |
| 2009/0085553 | A1 | 4/2009 | Kumar | |
| 2010/0190049 | A1 | 7/2010 | Kawase et al. | |
| 2010/0213887 | A1 | 8/2010 | Louch | |
| 2010/0216016 | A1 | 8/2010 | Seino | |
| 2010/0261043 | A1 | 10/2010 | Kim | |
| 2010/0261048 | A1 | 10/2010 | Kim | |
| 2010/0305792 | A1 | 12/2010 | Wilk | |
| 2011/0008659 | A1 | 1/2011 | Okada | |
| 2011/0025258 | A1 | 2/2011 | Kim | |
| 2011/0027630 | A1 * | 2/2011 | Tsutsumi | H01M 10/0459 429/153 |
| 2011/0049977 | A1 | 3/2011 | Onnerud | |
| 2011/0057617 | A1 | 3/2011 | Finberg | |
| 2011/0073717 | A1 | 3/2011 | Foucault | |
| 2011/0181233 | A1 | 7/2011 | Mino | |
| 2011/0291619 | A1 | 12/2011 | Asakura | |
| 2012/0103714 | A1 | 5/2012 | Choi | |
| 2012/0133310 | A1 | 5/2012 | Lee | |
| 2012/0146572 | A1 | 6/2012 | Ward | |
| 2012/0183823 | A1 | 7/2012 | Von Borck et al. | |
| 2012/0258337 | A1 | 10/2012 | Wang | |
| 2013/0032219 | A1 | 2/2013 | Heim | |
| 2013/0115506 | A1 | 5/2013 | Wayne et al. | |
| 2013/0181661 | A1 | 7/2013 | Workman | |
| 2013/0293198 | A1 | 11/2013 | Nakashima | |
| 2013/0307479 | A1 | 11/2013 | Kim | |
| 2013/0330577 | A1 | 12/2013 | Kristofek | |
| 2014/0032034 | A1 | 1/2014 | Raptopoulos | |
| 2014/0061376 | A1 | 3/2014 | Fisher | |
| 2014/0117756 | A1 | 5/2014 | Takahashi | |
| 2014/0239904 | A1 * | 8/2014 | Tanaka | H01M 10/0481 320/128 |
| 2014/0248520 | A1 | 9/2014 | Ward | |
| 2014/0312828 | A1 | 10/2014 | Vo | |
| 2015/0048783 | A1 | 2/2015 | Albertus | |
| 2015/0200429 | A1 | 7/2015 | Lee | |
| 2015/0236315 | A1 | 8/2015 | Hofer | |
| 2015/0303537 | A1 | 10/2015 | Jung et al. | |
| 2015/0355285 | A1 | 12/2015 | Nishigaki et al. | |
| 2015/0357852 | A1 | 12/2015 | Nakao et al. | |
| 2015/0369869 | A1 | 12/2015 | Tsuzuku et al. | |
| 2016/0003553 | A1 | 1/2016 | Campbell | |
| 2016/0036023 | A1 | 2/2016 | Dekeuster | |
| 2016/0093845 | A1 | 3/2016 | DeKeuster et al. | |
| 2016/0107756 | A1 | 4/2016 | Liske | |
| 2016/0311545 | A1 | 10/2016 | Parks | |
| 2017/0122679 | A1 | 5/2017 | Kenney et al. | |
| 2017/0288286 | A1 | 10/2017 | Buckhout | |
| 2017/0331323 | A1 | 11/2017 | Ehrmantraut | |
| 2017/0373512 | A1 | 12/2017 | Wang | |
| 2018/0149703 | A1 | 5/2018 | Tohara et al. | |
| 2018/0301676 | A1 * | 10/2018 | Kim | H01M 50/209 |
| 2018/0375176 | A1 | 12/2018 | Sakabe et al. | |
| 2019/0115784 | A1 | 4/2019 | Ehrmantraut | |
| 2019/0140235 | A1 | 5/2019 | Lindstrom | |
| 2020/0274203 | A1 | 8/2020 | Kirleis et al. | |
| 2020/0274371 | A1 | 8/2020 | Kirleis et al. | |
| 2021/0101485 | A1 | 4/2021 | Zhang | |
| 2021/0391731 | A1 | 12/2021 | Kirleis et al. | |
| 2022/0328921 | A1 | 10/2022 | McLean et al. | |
| 2023/0098629 | A1 | 3/2023 | Fukuda et al. | |
| 2024/0250331 | A1 | 7/2024 | Aguilar et al. | |

FOREIGN PATENT DOCUMENTS

| | | | | |
|---|---|---|---|---|
| DE | 2925248 | A1 * | 1/1981 | |
| DE | 102011016799 | A1 | 3/2012 | |
| DE | 102014018304 | A1 * | 6/2016 | H01M 50/204 |
| DE | 102018114439 | A1 | 12/2019 | |
| DE | 102019125382 | A1 | 3/2021 | |
| DE | 102019007748 | A1 | 5/2021 | |
| EP | 2973935 | B1 | 10/2018 | |
| JP | 2014127338 | A | 7/2014 | |
| WO | 2007025096 | A1 | 3/2007 | |
| WO | 2011093105 | A1 | 8/2011 | |
| WO | 2011149544 | A1 | 12/2011 | |
| WO | 2013037742 | A1 | 3/2013 | |
| WO | 2014145756 | A1 | 9/2014 | |
| WO | 2015012769 | A1 | 1/2015 | |
| WO | 2017197245 | A1 | 11/2017 | |
| WO | 2021199493 | A1 | 10/2021 | |

(56) References Cited

FOREIGN PATENT DOCUMENTS

| | | | |
|---|---|---|---|
| WO | 2022207201 | A1 | 10/2022 |
| WO | 2022207210 | A1 | 10/2022 |

OTHER PUBLICATIONS

Machine Translation of DE-102014018304-A1 (Year: 2016).*

Linear Technology Corporation, "Linear Technology LTC2439-1,8-/16-Channel 16-Bit No Latency AE™ ADC," LT0915 Rev B, 2005, 30 pages.

Linear Technology LTM8048, 3.1VIN to 32 VIN Isolated µModule DC/DC Converterwith LOO Post Regulator, LT D715 Rev G, © Linear Technology Corporation 2011, 20 pages.

Analog Devices, Inc. "Analog Devices Micropower Quad-Channel Digital Isolators Data Sheet ADuM1440/ADuM1441/ADuM1442/ADuM1445/ADuM1446/ADuM1447," D11845-01/17(E), 2017, 25 pages.

Murnane et al.,"A Closer Look at State of Charge (SOC) and State of Health (SOH) Estimation Techniques for Batteries," Analog Devices, Inc., 2017, 8 pages.

Microchip Technology Inc., "Microchip MCP23017/MCP23S17 16-Bit 1/0 Expander with Serial Interface," DS20001952C, 2016,42 pages.

Merrit et al., "Halbach Arrah Motor/Generators—A Novel Generalized Electric Machine," Halbach Festschrift Symposium, Berkeley, CA, Feb. 3, 1995, 8 pages.

International Searching Authority, "International Search Report and Written Opinion," issued in connection with International Patent Application PCT/US2017/032373, dated Aug. 16, 2017, 21 pages.

United States Patent and Trademark Office, "Non-Final Office Action," issued in connection with U.S. Appl. No. 15/593,617 dated Feb. 9, 2018, 5 pages.

United States Patent and Trademark Office, "Final Office Action," issued in connection with U.S. Appl. No. 15/593,617 dated May 25, 2018, 6 pages.

United States Patent and Trademark Office, "Notice of Allowance and Fees Due," issued in connection with U.S. Appl. No. 15/593,617 dated Aug. 2, 2018, 7 pages.

United States Patent and Trademark Office, "Non-Final Office Action," issued in connection with U.S. Appl. No. 16/207,940 on Feb. 7, 2019, 7 pages.

United States Patent and Trademark Office, "Final Office Action," issued in connection with U.S. Appl. No. 16/207,940 on May 29, 2019, 10 pages.

United States Patent and Trademark Office, "Notice of Allowance," issued in connection with U.S. Appl. No. 16/207,940 on Aug. 19, 2019, 7 pages.

European Patent Office, "Extended European Search Report", issued in connection with application No. 17796925.0 dated Dec. 3, 2019, 11 pages.

European Patent Office, "Extended European Search Report ", issued in connection with European Appl. No. 20154272.7, dated Jun. 10, 2020, 8 pages.

United States Patent and Trademark Office, "Office Action", issued in connection with U.S. Appl. No. 16/283,034, dated Jan. 15, 2021, 7 pages.

United States Patent and Trademark Office, "Ex Parte Qualye Action", issued in connection with U.S. Appl. No. 16/283,057, dated Feb. 18, 2021, 5 pages.

United States Patent and Trademark Office, "Notice of Allowance", issued in connection with U.S. Appl. No. 16/283,057, dated Apr. 21, 2021, 8 pages.

United States Patent and Trademark Office, "Notice of Allowance", issued in connection with U.S. Appl. No. 16/283,034, dated May 28, 2021, 9 pages.

United States Patent and Trademark Office, "Notice of Allowance," issued in connection with U.S. Appl. No. 17/461,349 on Mar. 16, 2023, 8 pages.

United States Patent and Trademark Office, "Non-Final Rejection" issued in U.S. Appl. No. 17/577,290 mailed on Jun. 15, 2023, 19 pages.

European Patent Office, "Partial European Search Report," issued in connection with European Patent Application No. 23151556.0, Jun. 15, 2023, 13 pages.

European Patent Office, "Extended European Search Report," issued in connection with European Patent Application No. 23151556.0 on Oct. 2, 2023, 11 pages.

United States Patent and Trademark Office, "Final Office Action," issued in connection with U.S. Appl. No. 17/577,290, dated Oct. 3, 2023, 20 Pages.

United States Patent and Trademark Office, "Non-Final Office Action," issued in connection with U.S. Appl. No. 17/577,290, dated Jan. 12, 2024, 14 pages.

European Patent Office, "Communication pursuant to Article 94(3) EPC," issued in connection with European Patent Application No. 23151556.0-1004 on Mar. 11, 2025, 5 pages.

United States Patent and Trademark Office, "Notice of Allowance and Fee(s) Due," issued in connection with U.S. Appl. No. 17/486,699, dated Apr. 2, 2025, 7 pages.

United States Patent and Trademark Office, "Non-Final Office Action," issued in connection with U.S. Appl. No. 18/591,407, dated May 18, 2026, 29 pages.

* cited by examiner

BATTERIES, BATTERY COMPONENTS, AND RELATED METHODS AND APPARATUS FOR MITIGATING A THERMAL RUNAWAY EVENT OF A BATTERY

RELATED APPLICATION

This patent arises as a divisional of U.S. patent application Ser. No. 17/577,290, which was filed on Jan. 17, 2022. U.S. patent application Ser. No. 17/577,290 claims the benefit under 35 U.S.C. § 119(e) to U.S. Provisional Application No. 63/172,458, titled "Batteries, Battery Components, and Related Methods and Apparatus for Mitigating a Thermal Runaway Event of a Battery," filed Apr. 8, 2021. U.S. patent application Ser. No. 17/577,290 and U.S. Provisional Application No. 63/172,458 are hereby incorporated by reference in their entireties. Priority to U.S. patent application Ser. No. 17/577,290 and U.S. Provisional Application No. 63/172,458 is hereby claimed.

FIELD OF THE DISCLOSURE

This disclosure relates generally to batteries and, more particularly, to batteries, battery components, and related methods and apparatus for mitigating a thermal runaway event of a battery.

BACKGROUND

Thermal runaway events of batteries, such as lithium-ion batteries, occur when the temperature of a battery surges rapidly outside of a normal operating temperature range, thereby causing a sudden release of the energy stored in the battery, which further increases the temperature of the battery and further perpetuates release of the energy. These events may result in battery failure and may impact the operation of the vessel or vehicle containing the battery, such as an aircraft. There are a number of circumstances that may contribute to the occurrence of thermal runaway events of batteries including a short circuit or an impact to the battery. Battery design, monitoring, and maintenance are important factors for reducing the risk of thermal runaway events in batteries.

SUMMARY

This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented in this disclosure.

An example battery disclosed herein includes an enclosure defining a cavity. The enclosure includes a first end wall and a second end wall opposite the first end wall. The example battery also includes a battery cell disposed in the cavity of the enclosure and a load spreader disposed in the cavity of the enclosure. The load spreader is spaced from the first end wall. The battery cell is disposed between the load spreader and the second end wall of the enclosure. The load spreader is at least partially compressing the battery cell between the load spreader and the second end wall.

An example system disclosed herein includes a battery including a sealed enclosure defining a cavity. The system further includes a battery cell disposed in the cavity of the enclosure, and a cooling plate having a fluid channel between an inlet port and an outlet port. The cooling plate is to reduce a temperature of the battery.

Another example battery system disclosed herein includes a battery. The battery includes a sealed enclosure defining a cavity. The enclosure includes a side wall with an opening formed in the side wall. A battery cell is disposed in the cavity of the enclosure and a diaphragm is coupled to the side wall and covering the opening. The battery system further includes a puncture pin disposed outside of the enclosure and adjacent the diaphragm such that when pressure increases in the cavity, the diaphragm flexes outward and is punctured by the puncture pin.

An example aircraft disclosed herein includes a propulsor, an electric motor to drive the propulsor to produce thrust, and a battery to supply electrical power to the electric motor. The battery includes an enclosure defining a cavity. The enclosure is constructed of a nickel-chromium alloy. The battery includes a battery cell in the cavity.

Figure 1:
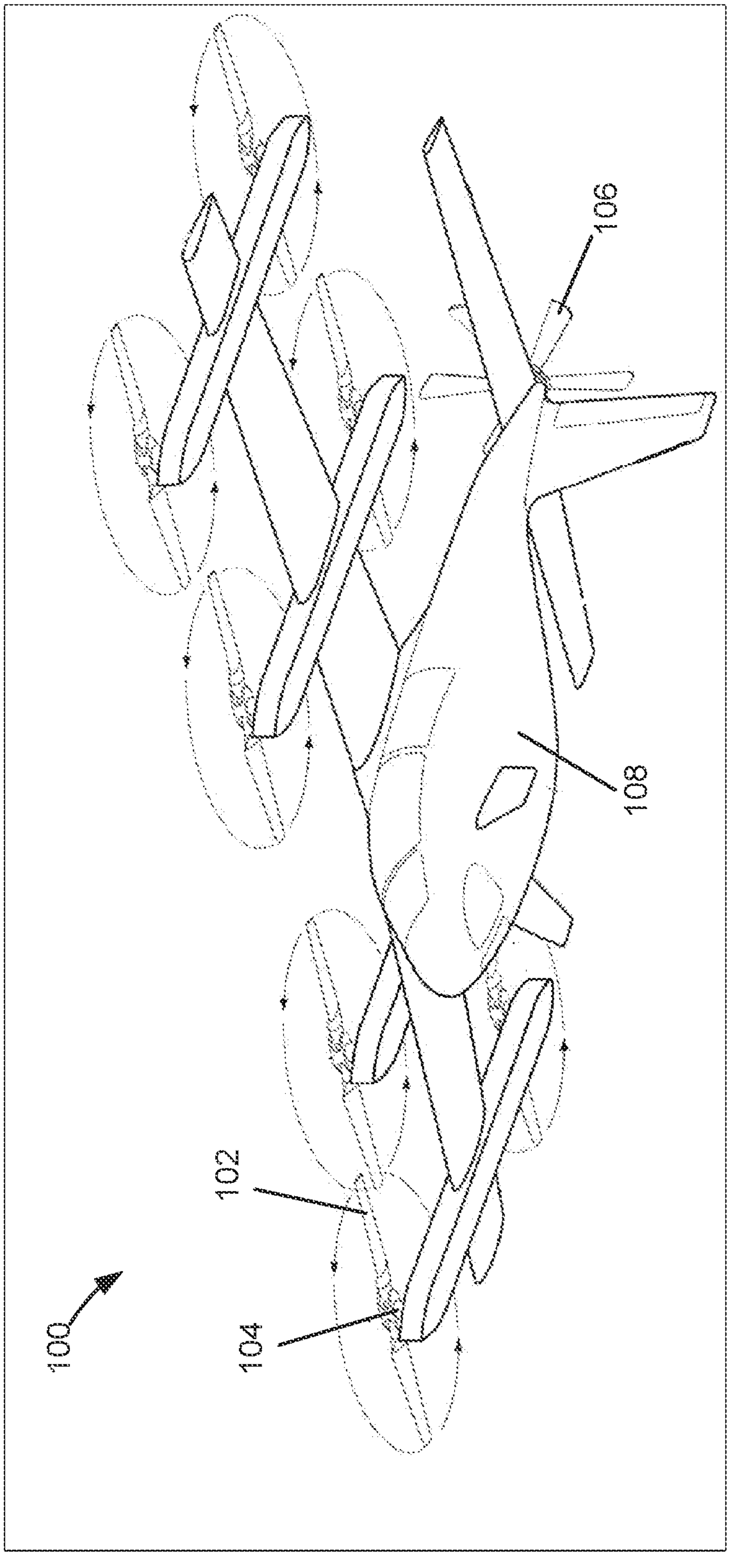
FIG. 1 is an example aircraft in which one or more of the example batteries and/or example battery systems disclosed herein can be implemented.

The FIGURES are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Batteries, such as lithium-ion batteries, are commonly used in vehicles such as electric vehicles. For example, electric aircraft typically include one or more lithium-ion batteries to power one or more electric motors for flying the aircraft and/or other electrical systems on the aircraft. Batteries can also be used in fuel-powered vehicles for storing power to be used in the cabin and/or for other electrical systems on the vehicle.

Batteries have an operating temperature range where the battery operates most efficiently and safely. When the temperature of a battery increases rapidly, exceeding the operating temperature range, a thermal runaway event can occur. The rapid increase in temperature causes the battery to over-release energy, which further increases the temperature and perpetuates the energy release. This can cause the battery to overheat, fail and/or otherwise affect the operation of the battery, thereby affecting the operation of the vehicle containing the battery. Factors such as short circuiting, improper handling of a battery, impact to an aircraft, or mechanical failures may all lead to elevated battery temperatures and induce a thermal runaway event.

Mechanical stability and thermal management of the battery and battery environment are important aspects for mitigating the occurrence of thermal runaway events in batteries. For example, the enclosure or housing of the battery should be durable enough to withstand the temperature increase of the battery environment to contain the thermal runaway and provide thermal protection to surrounding elements. A key obstacle in battery technology is maximizing the energy density of batteries by minimizing their weight. Currently, most battery enclosures are made of heavy, reinforced aluminum, which effectively reduces the energy density of the batteries that they hold.

Disclosed herein are example batteries, battery components, and related methods and apparatus that mitigate the adverse effects of a thermal runaway event of a battery. An example battery disclosed herein includes an enclosure and one or more battery cells (e.g., lithium-ion cells) disposed in the enclosure. In some examples, the enclosure is constructed of thin-walled nickel-chromium alloy (e.g., Inconel®). The nickel-chromium alloy enclosure is sufficiently strong, to contain high pressures during a thermal runaway event, but relatively light. This results in a high energy density battery assembly, which is desirable in vehicles like aircraft where weight is an important consideration. The nickel-chromium alloy enclosure further provides for high temperature endurance to contain the temperature increase of a battery during a thermal runaway event. In other examples, the enclosure can be constructed of other materials, such as stainless steel (e.g., 316 stainless steel). In some examples, the enclosure is hermetically sealed. In some examples, the enclosure includes a container (e.g., a five-sided container with an open top) and a lid coupled to a top of the container. In some examples, the lid is riveted to the top of the container. In some examples, one or more walls of the enclosure can be double walled. The example enclosure can have a vertical orientation or a horizontal orientation, the orientation determining the orientation of the battery cells within the enclosure.

Also disclosed herein are example vents, or exhaust ducts, for batteries for releasing highly pressurized fluid from the battery if a thermal runaway event occurs. For example, an example battery enclosure can include a vent opening and a diaphragm covering the vent opening. In some examples, a puncture pin is disposed outside of the example enclosure and adjacent to the example diaphragm. If a thermal runaway event occurs, the pressure inside the enclosure increases, which forces the diaphragm to flex outward. If the pressure inside of the enclosure reaches a certain point, the diaphragm is punctured by the puncture pin. The high-pressure fluid and/or gas in the enclosure is then vented, which reduces the likelihood of enclosure eruption.

Also disclosed herein are example load spreaders for maintaining installation pressure of the battery cells inside of the example enclosures. One example load spreader can include threaded adjuster tie rods. Another example load spreader can include first and second ribs coupled to opposite sidewalls to engage with the load spreader to hold the battery cells in their installed compressed state.

Also disclosed herein are cooling mechanisms where cooling plates can be disposed externally to the example enclosure, located inside of the enclosure, in between rows of battery cells, and/or along the walls of the enclosure surrounding the battery cells to mitigate heat. In some examples, the battery includes graphite (e.g., NeoGraf™) heat spreader sheets disposed between battery cells, a heat absorption material inside of the example enclosure, and/or an evaporating cooling fluid to further facilitate thermal control of the battery cells inside of the example enclosure.

The examples disclosed herein may be used exclusively or in combination with other examples described herein.

FIG. 1 illustrates an example aircraft 100 in which one or more of the example batteries and/or example battery systems disclosed herein can be implemented. In this example, the aircraft 100 is an electric aircraft. In other examples, the aircraft 100 can be a manned or unmanned aerial vehicle powered by other means (e.g., fuel-powered). The aircraft 100 shown in FIG. 1 is an electric vertical take-off and landing (VTOL) aircraft, while in other examples, the aircraft 100 can be another type of aircraft (e.g., a fixed wing aircraft, a rotorcraft such as a helicopter or quadcopter, etc.). As shown in FIG. 1, the example aircraft 100 has a plurality of vertical lift propulsors 102 (one of which is referenced in FIG. 1) each of which are driven by respective electric motors 104 (one of which is referenced in FIG. 1) to produce thrust for liftoff. The aircraft 100 can also have a forward propulsor 106 driven by a motor (e.g., an electric motor) to produce forward thrust. The example batteries and/or battery systems disclosed herein can be used to provide electrical power to the motors 104 (and the motor that drives the forward propulsor 106) and/or any other electrical system on the aircraft 100. Examples disclosed herein include one or more batteries disposed inside a body 108 (e.g., a fuselage) of the aircraft 100.

Figure 2A:
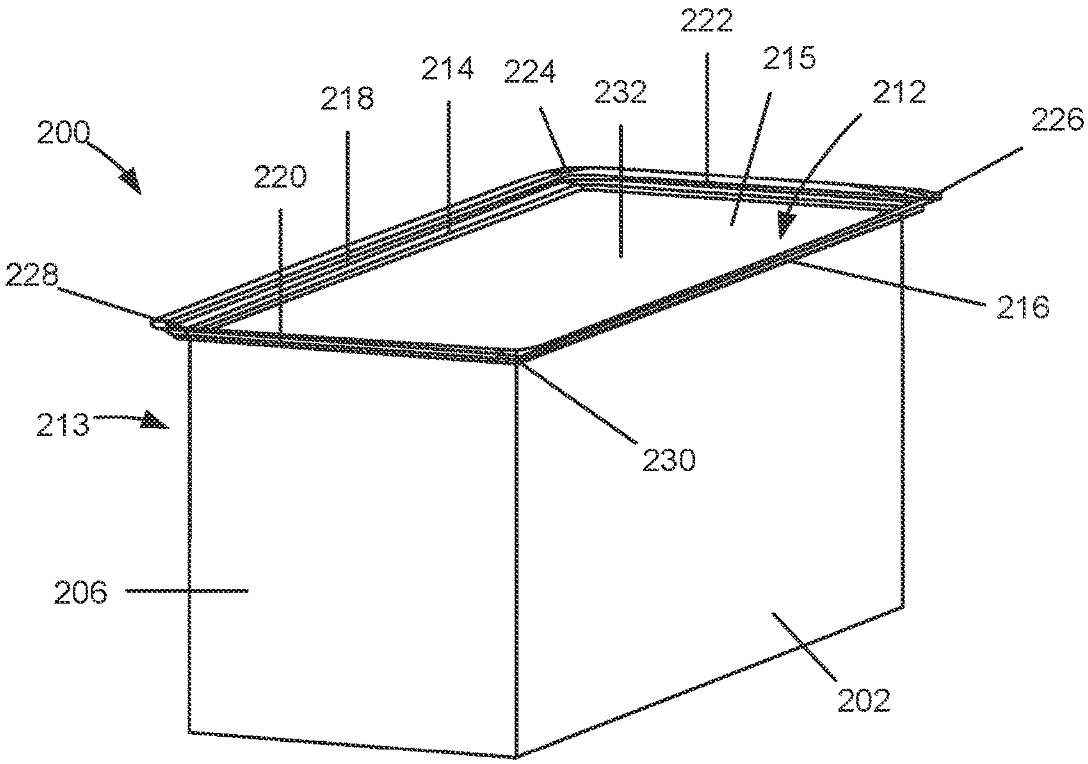
FIGS. 2A and 2B are perspective views of opposite sides of an example enclosure constructed in accordance with the teachings of this disclosure.
Figure 2B:
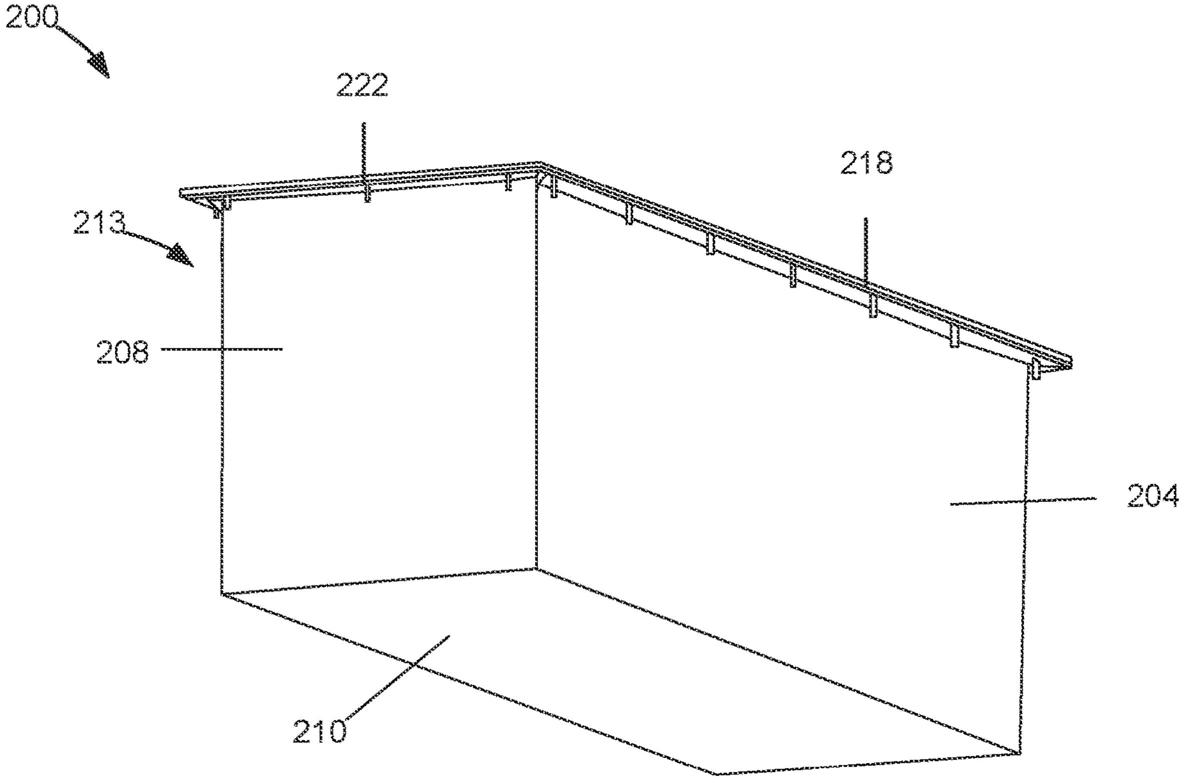

FIGS. 2A and 2B are perspective views of opposite sides of an example enclosure 200 constructed in accordance with the teachings of this disclosure. The example enclosure 200 can be implemented as a battery in the aircraft 100 of FIG. 1 to contain one or more battery cells (shown in FIG. 4A). The example enclosure 200 presented herein is cuboid shaped. More specifically, the enclosure 200 has a first sidewall 202, a second sidewall 204 that is opposite to the first sidewall 202, a first end wall 206 that is coupled between the first sidewall 202 and the second sidewall 204, and a second end wall 208 that is coupled between the first sidewall 202 and the second sidewall 204 and which is opposite to the first end wall 206. In other examples, the enclosure 200 can have other shapes and/or include more than four side/end walls. The enclosure 200 also includes a bottom wall 210 that is coupled to the first sidewall 202, the first end wall 206, the second sidewall 204, and the second end wall 208 to define a base, or bottom, of the enclosure 200. As such, the enclosure 200 defines a cavity 212 to accept battery cells or other battery elements that can be disposed inside of the cavity 212. The enclosure 200 include a container 213 formed by the first sidewall 202, the second sidewall 204, the first end wall 206, the second end wall 208, and the bottom wall 210.

In the example disclosed herein, the enclosure 200 has a countersunk lip 214 secured to a top edge 216, 218 of each of the first and second sidewalls 202, 204, respectively, and a top edge 220, 222 of each of the first and second end walls 206, 208, respectively, of the enclosure 200. As such, the countersunk lip 214 traverses along a top 215 of the enclosure 200. In other examples, the enclosure 200 can have a lip having a different shape such as flat or ribbed. In this example, the countersunk lip 214 of the enclosure 200 is pre-formed and secured to the top edges 216, 218, 220, and 222 during manufacture of the enclosure 200 by welding, brazing, etc. In other examples, the countersunk lip 214, or other shaped lip, can be installed after the manufacturing of the enclosure 200 by similar techniques.

The example enclosure 200, has countersunk corner patches stamped at each corner 224, 226, 228, and 230 of the cuboid-shaped enclosure 200 to mate the top edges 216, 218, 220, 222 of each first and second sidewall 202, 204 and first and second end wall 206, 208. In other examples, the corner patches at each corner 224, 226, 228, and 230 can have a similar shape as the countersunk lip 214 traversing along the top 215 of the enclosure 200 or can have a different shape such as ribbed or flat. In other examples, the enclosure 200 can have a different number of corner patches or no corner patches.

In this example, enclosure 200 has a lid 232 that is coupled to the container 213 to define the cavity 212 therein. In particular, in this example, the lid 232 is coupled to the first and second side walls 202, 204, and the first and second end walls 206, 208 and opposite the bottom wall 210 to define the top 215. Thus, the lid 232, when disposed over the top 215 of the enclosure 200, closes the container 213 to form the closed cavity 212 inside of the enclosure 200. In some examples, when the lid 232 is coupled to the container 213, the enclosure 200 is hermetically sealed. The example lid 232 can be constructed of a material similar to that of the enclosure 200, such as a nickel-chromium alloy in this example, or can be constructed of a material that is different to that of the enclosure 200. In some examples, the lid 232 can be constructed to overlap with the countersunk lip 214 to rest on the top 215 of the enclosure 200. In other examples, the lid 232 does not overlap with the countersunk lip 214 but is sealed to the top edges 216, 218 of the first and second side walls 202, 204 and the top edges 220, 222 of the first and second end walls 206, 208. The lid 232 can be sealed with a sealant or an adhesive (e.g., 3M™ High-Temperature Sealant 1137, Loctite™ 2000 Putty). In some examples, the lid 232 is coupled to the container 213 via fasteners (e.g., one or more rivets, threaded fasteners such as bolts or screws, etc.). In some examples, the lid 232 is removable to access battery cells and/or other components disposed inside the cavity 212 of the enclosure 200.

Figure 3A:
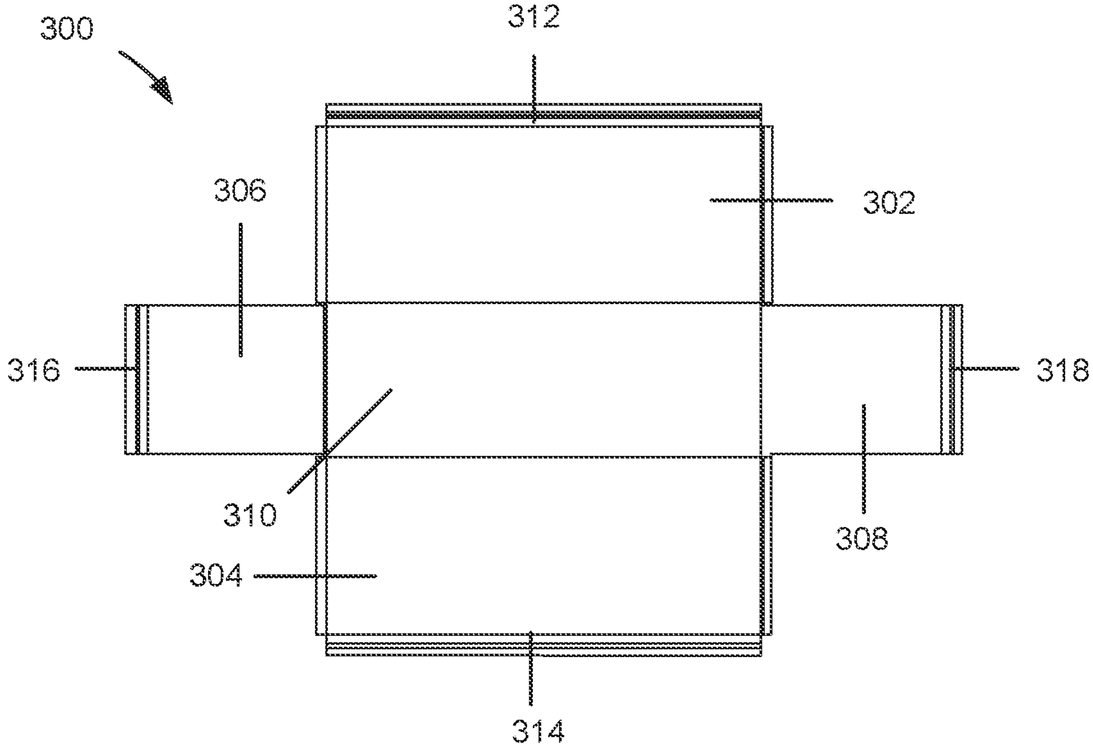
FIGS. 3A and 3B show examples of the example enclosure of FIGS. 2A and 2B in a deconstructed form.
Figure 3B:
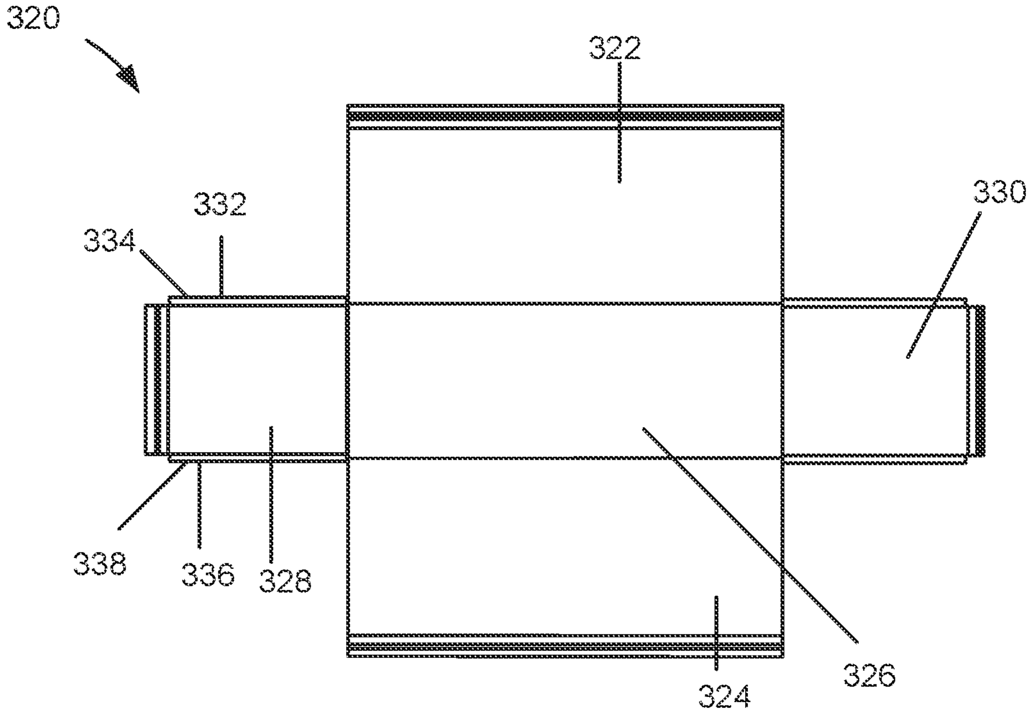

FIGS. 3A and 3B show a top views of two examples of the enclosure 200 of FIGS. 2A and 2B in a deconstructed form. As illustrated by FIG. 3A, the deconstructed enclosure 300 can be constructed of a single sheet of material (e.g., nickel-chromium alloy such as Inconel® alloy, stainless steel, etc.) that can be cut out in a cross shape including panels for first and second sidewall panels 302, 304, first and second end wall panels 306, 308, and base panel 310 of the enclosure 300. As such, when folded, the panels 302-310 of the deconstructed enclosure 300 form the first and second sidewall 202, 204, first and second end wall 206, 208, and bottom wall 210 of the enclosure 200 of FIG. 2A. In this example, once folded into the cuboid shape, the first and second sidewall panels 302, 304 and first and second end wall panels 306, 308, of the deconstructed enclosure 300 are sealed to form the closed enclosure 200 (e.g., a hermetically sealed enclosure) as seen in FIGS. 2A and 2B. In other examples, the first and second sidewall panels 302, 304 and first and second end wall panels 306, 308 can be sealed with an adhesive, welded, or riveted together. As described above, in this example, the deconstructed enclosure 200 has a countersunk lip 214 traversing along the top edge of the enclosure 200. As illustrated in FIG. 3A, the deconstructed enclosure 300 has a countersunk rim 312, 314, 316, and 318 coupled to each panel of the first and second sidewall 302, 304 and end wall 306, 308, panels of the deconstructed enclosure 300, respectively. As such, once the deconstructed enclosure 300 is folded, the countersunk rim 312, 314, 316, and 318 of each first and second sidewall and end wall panels 302-308 forms the countersunk lip 214 of the enclosure 200 of FIG. 2A. The example deconstructed enclosure 300, and therefore constructed enclosure 200, is composed of a nickel-chromium alloy (e.g., Inconel® alloy, etc.). However, in other examples the enclosure 300 can be composed of other materials (e.g., stainless steel, a composite material, titanium, aluminum, etc.). In the examples disclosed herein, the nickel-chromium alloy used to manufacture the deconstructed enclosure 300, and therefore constructed enclosure 200 of FIGS. 2A and 2B, has a 26-gauge thickness. In other examples, the nickel-chromium alloy can have different thicknesses for each sidewall and/or end wall.

As illustrated by FIG. 3B, in other examples the deconstructed enclosure 320 can be constructed of three sheets of material (e.g., Inconel® alloy, stainless steel, etc.) and assembled to form the enclosure 200 of FIGS. 2A and 2B. The material can be cut out of a single sheet to include panels for first and second sidewall panels 322, 324 and base 326 of the enclosure 320. As such, when folded, the panels 322-326 of the deconstructed enclosure 320 form the first and second sidewall 202, 204, and bottom wall 210 of the enclosure 200 of FIG. 2A. In some examples, a second and third sheet of material define first and second end wall panels 328, 330 for the first and second end walls 206 and 208 of the enclosure 200 of FIG. 2A. In some examples, the first end wall panel 328 includes a first flange 332 disposed along a first edge 334 of the panel 328 and a second flange 336 on a second edge 338 of the panel opposite the first edge 334. In some examples, the second end wall panel 330 is constructed in a substantially similar way as the first end wall panel 328. As such, the enclosure 320 is assembled by attaching the first and second end wall panels 328, 330 to the first sheet including the first and second sidewall panels 322, 324 and base 326 of the enclosure 320. In some examples, the first and second flanges 332, 336 of the first and second end wall panels 328, 330 are bent to mate with the first and second sidewall panels 322, 324. The first and second flanges 332, 336 can be used to position the first and second end wall panels 328, 330 to the first and second sidewall panels 322, 324, respectively. In this example, once assembled into the cuboid shape, the first and second sidewall panels 322, 324 and the first and second end wall panels 328, 330, of the deconstructed enclosure 320 are laser welded to form the closed enclosure 200 as seen in FIGS. 2A and 2B. In other examples, the first and second sidewall panels 322, 324 and first and second end wall panels 328, 330 can be sealed or sealed with an adhesive or riveted together (e.g., to form a hermetically sealed enclosure). In some examples, the enclosure 320 can include a portion of a countersink rim as described above with FIG. 3A.

Figure 4A:
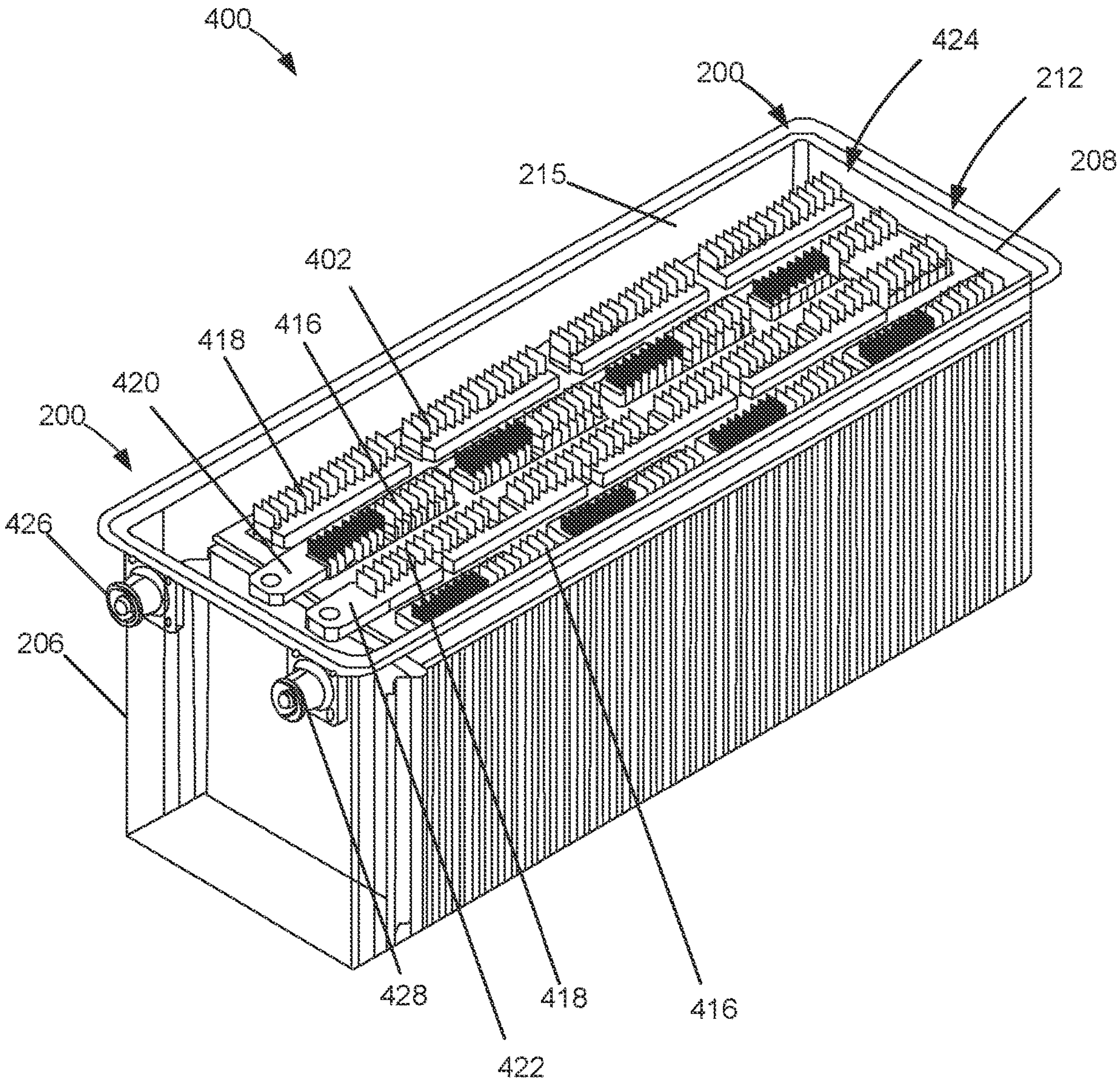
FIGS. 4A and 4B are top perspective views of example batteries that can be implemented by the aircraft FIG. 1 including battery cells.
Figure 4B:
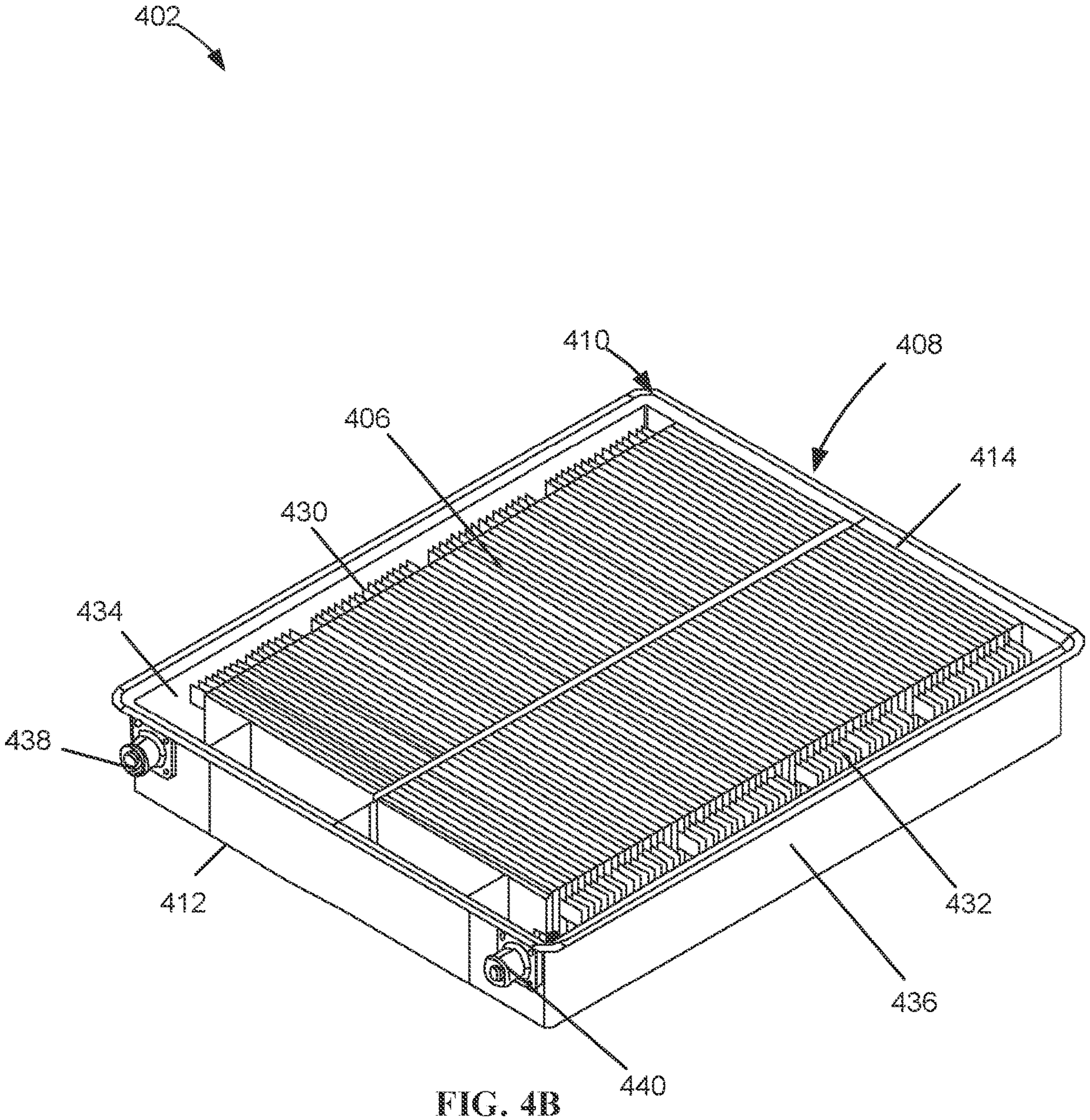

FIGS. 4A and 4B are top perspective views of example batteries 400 and 402 that can be implemented by the aircraft 100 of FIG. 1 including battery cells. The example battery 400 of FIG. 4A includes the enclosure 200 of FIGS. 2A and 2B. FIG. 4A illustrates the example battery 400 with battery cells 404 oriented vertically disposed within the cavity 212 of the enclosure 200. The enclosure 200 of the battery 400 illustrated in FIG. 4A includes a modified version of the enclosure 200 of FIGS. 2A and 2B and can include additional elements disclosed herein. The lid 232 (FIG. 2A) has also been removed. FIG. 4B illustrates the example battery 402 with battery cells 406 oriented horizontally disposed within the cavity 408 of a horizontal enclosure 410. The horizontal enclosure 410 can be substantially the same as the enclosure 200 but has a different shape. As shown by FIGS. 4A and 4B, each of the batteries 400, 402 includes a plurality of battery cells 404, 406. Examples disclosed herein include 128 battery cells 404, 406 disposed in the cavity 212, 408 of each enclosure 200, 410, respectively. In other examples, the batteries 400, 402 can include any number of battery cells 404, 406 (e.g., one battery cell, 16 battery cells, 200 battery cells, etc.). However, it is understood that energy density of the battery 400, 402 diminishes as the number of battery cells 404, 406 decreases and, thus, limits the performance capacity and cycle life of the battery 400, 402. In contrast, a tradeoff in increasing the number of battery cells 404, 406 in the battery 400, 402 is an increased mass of the battery 400, 402 which may also limit the performance of the aircraft 100 containing the battery 400, 402. The example batteries 400, 402 include battery cells 404, 406 that are implemented using lithium-ion battery cells. In other examples, the battery cells 404, 406 can be implemented using other types of battery cells, such lithium polymer cells, nickel cadmium cells, or nickel-metal hydride, for example. In some examples, the battery cells 404, 406 are grouped into sections or bricks. In some examples, the battery cells 404, 406 are pouch cells, whereas other examples can include cylindrical battery cell(s) or prismatic cell(s). In the illustrated example, the battery cells 404, 406 are arranged in a single row between the first end wall 206 and the second end wall 208 of enclosure 200 of FIG. 4A and a first end wall 412 and a second end wall 414 of enclosure 410 of FIG. 4B, respectively. In other examples, the battery cells 404, 406 can be arranged in two or more rows or other configurations. In some examples, the battery cells 404, 406 are supported by and rest on the bottom wall 210 of enclosure 200 of FIG. 4A and a bottom wall of the enclosure 410 of FIG. 4B, respectively. In other examples, the battery cells 404, 406 can be spaced apart from a base of the enclosure 200, 410. In some examples, the enclosure 200, 410 includes features on which the battery cells 404, 406 can rest on. During use or operation of the battery 400, 402, the temperature of a battery environment can increase and, if not controlled, can result in a thermal runaway event in one or more of the battery cells 404, 406 and cause battery failure.

In the illustrated example of FIG. 4A, each of the battery cells 404 of the battery 400 has a first terminal 416 (e.g., a first tab) and a second terminal 418 (e.g., a second tab). In the example battery 400, the battery cells 404 are oriented vertically within the cavity 212 of the enclosure 200 so that the first and second terminals 416, 418 face the top 215 (e.g., the lid) of the enclosure 200. The first terminals 416 of the battery cells 404 can be positively charged terminals and the second terminals 418 of the battery cells 404 can be negatively charged terminals. The example battery of FIG. 4A includes a first bus bar 420 and a second bus bar 422 disposed in the cavity 212 of the enclosure 200. In some examples the first and second bus bars 420, 422 rest on the tops of the battery cells 404. In other examples, the first and second bus bars 420, 422 are spaced apart from the tops of the battery cells 404.

In the illustrated example of FIG. 4A, the battery 400 includes a first bus bar connector 426 (e.g., a SurLok™ bus connector) and a second bus bar connector 428 coupled to the exterior of the first end wall 206 of the enclosure 200. For example, the first and second connectors 426, 428 can couple the first and second bus bars 420, 422, respectively, to one or more external circuits, such as electrical circuits. In this example, the first terminals 416 of the battery cells 404 are coupled (e.g., electrically coupled) to the first bus bar 420 and the second terminals 418 are coupled to the second bus bar 422. The first and second bus bars 420, 422 can be constructed of a conductive material, such as a metal (e.g., copper, aluminum, etc.). As such, the first and second bus bars 420, 422 electrically couple the first terminals and the second terminals 416, 418 of the battery cells 404 to the first and second bus connectors 426, 428. In some examples, the first and second bus connectors 426, 428 are welded (e.g., laser welded) to the first and second bus bars 420, 422, respectively. In other examples, the first and second bus connectors 426, 428 can be coupled to the first and second bus bar 420, 422, respectively, in other manners.

As shown in FIG. 4B, the battery cells 406 of the battery 402 are disposed in the cavity 408 and oriented horizontally. In some examples, this type of battery orientation is advantageous compared to the vertical orientation of battery 400 of FIG. 4A. For example, depending on a space capacity or design of an aircraft, the design of the battery 402 may better fit the design goals and requirements of an aircraft. As such, first and second terminals 430, 432 of the battery cells 406 face first and second sidewalls 434, 436 of the enclosure 410. In other examples, the first and second terminals 430, 432 of the battery cells 406 can face a center or centerline of the enclosure 410. In some examples, the battery 402 can include a first bus bar disposed between the top of the battery cells 406 and the first sidewall 434 and a second busbar disposed between the top of the battery cells 406 and the second sidewall 436. The example battery 402 includes a first bus bar connector 438 (e.g., a SurLok™ bus connector, etc.) and a second bus bar connector 440 coupled to the exterior of the first end wall 412 of the enclosure 410. As described above in connection with battery 400 of FIG. 4A, the first and second connectors 438, 440 can couple the first and second bus bars, respectively, to one or more external circuits. It is understood herein, that the first and second bus bars not pictured in this figure and the bus bar connectors 438, 440 of FIG. 4B can be substantially the same as the first and second bus bars 420, 422 and bus bar connectors 426, 428 of FIG. 4A and described above.

Figure 5A:
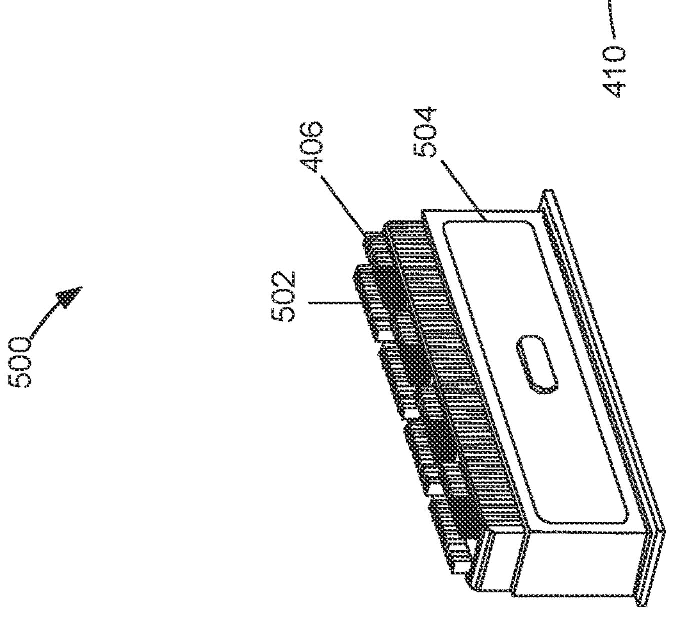
FIGS. 5A-5C are perspective views of an installation process of battery cells into the enclosure of the example battery FIG. 4B.
Figure 5B:
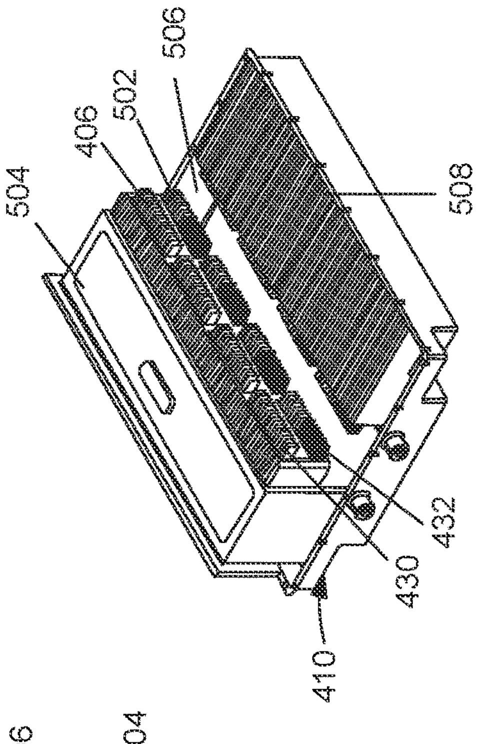
Figure 5C:
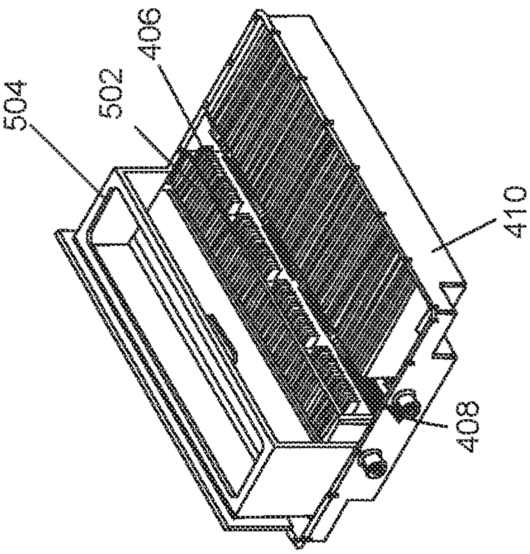

FIGS. 5A-5C illustrate a perspective view of an installation 500 of the battery cells 406 into the enclosure 410 of the example battery 402 of FIG. 4B in a horizontal configuration. As shown in FIG. 5A, during manufacturing of the example battery 402, a row 502 of battery cells 406 is fitted and loaded into an example fixture 504. The example fixture 504 can be cuboid shaped to enable the installation of battery cells and subsequent removal of the battery cells from the fixture. In some examples, the fixture 504 can have dimensions that are substantially similar to those of the enclosure 410. The example fixture 504 can have one or more sidewalls and/or end walls that are cut-out or hollow to enable placement of battery cells into the fixture 504 and/or removal of the battery cells from the fixture 504. In some examples, the fixture 504 maintains an applied stack pressure on the battery cells 406 as the battery cells 406 are welded together. The pressure applied to the battery cells 406 is maintained to mitigate movement of the battery cells 406 after the battery cells 406 are installed into the enclosure 410 and during the operation of the example battery 400. Maintaining installation pressure on the battery cells 406 is also important for optimizing electrical and thermal performance of the battery cells 406 over the life of the battery 402.

FIG. 5B illustrates the placement of the fixture 504 loaded with the row 502 of the welded battery cells 406 over a top 506 of the enclosure 410. In this example, the fixture 504 aligns with a space in the enclosure 410 in which the row 502 of battery cells 406 will be disposed. As illustrated by FIG. 5B, a second row 508 of the battery cells 406 has been installed into the enclosure 410. In this example, the rows 502, 508 of the battery cells 406 are oriented horizontally within the enclosure 410. In this example, the first and second terminals 430, 432 of the rows 502, 508 of the battery cells 406 face the center or centerline of the enclosure 410. In other examples, the first and/or second terminals 430, 432 of the battery cells 406 face the first and second sidewalls 434, 436 (FIG. 4B) of the enclosure 410.

FIG. 5C illustrates the installation of the row 502 of the battery cells 406 into the cavity 408 of the enclosure 410. During installation, the row 502 of the welded battery cells 406 is removed from the fixture 504 and disposed into the cavity 408 of the enclosure 410 while the fixture is held over the top 506 of the enclosure 410. As such, the row 502 of battery cells 406 maintains the applied installation pressure as the battery cells 406 are placed into the cavity 408 of the enclosure 410. Once the battery cells 406 are installed into the enclosure 410, the pressure applied to the battery cells 406 is maintained as the battery cells 406 are disposed in the enclosure 410 during operation of the example battery 402. As such, the applied pressure mitigates movement of the battery cells 406 within the enclosure 410 to reduce damage to the battery cells 406 during the operation of the battery 402.

Figure 6A:
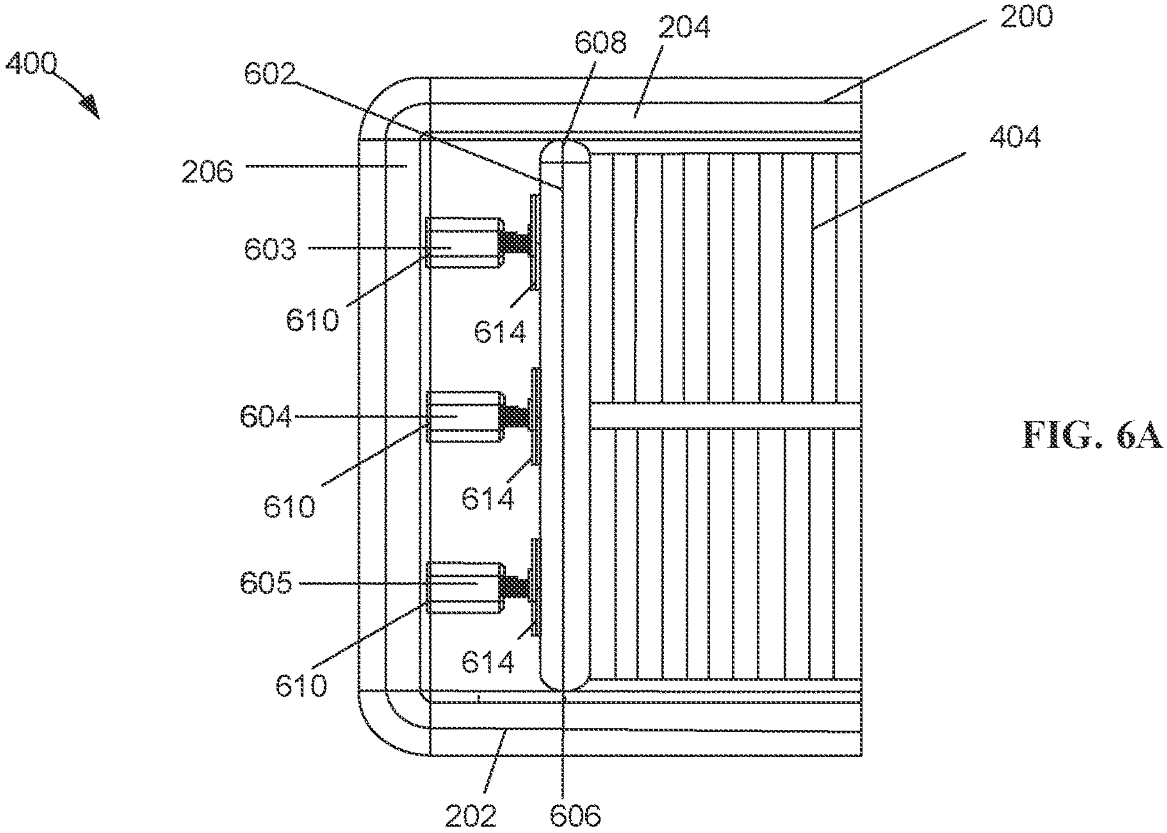
FIGS. 6A and 6B are top and top-right perspective views of a portion of the example battery of FIG. 4A including a load spreader and adjuster tie rods(s).
Figure 6B:
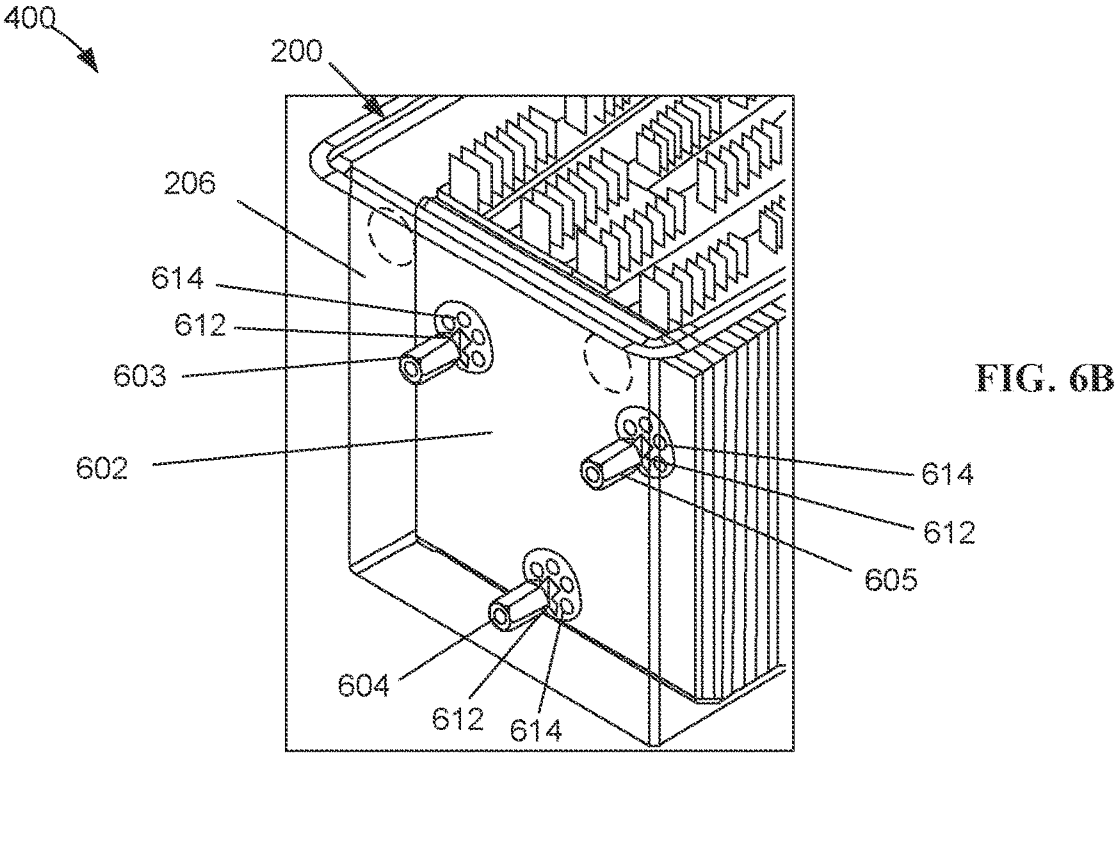

FIGS. 6A and 6B show a portion of the example battery 400 including a load spreader 602 and adjuster tie rods(s) 603, 604, 605 to compress the battery cells 404. FIG. 6A shows a top view of a portion of the example battery 400 including the load spreader 602 and the adjuster tie rods 603, 604, 605. FIG. 6B shows a top-right perspective view of a portion of the example battery 400 including the load spreader 602 and the adjuster tie rods 603, 604, 605. In FIGS. 6A-6B, the bus bars 420, 422 and bus bar connectors 426, 428 (indicated by dashed lines) shown in FIG. 4A have been removed. However, it is understood that these elements are included in the example battery of FIGS. 6A-6B. As shown in FIG. 6A, the example load spreader 602 is disposed in the cavity 212 of the enclosure 200. In this example, the load spreader 602 is a rectangular plate with a first side edge 606 and a second side edge 608 to mate with the first sidewall 202 and second sidewall 204 of the enclosure 200, respectively. In other examples, the load spreader 602 can have other shapes. In some examples, the load spreader 602 is constructed of a carbon fiber material (Nomex® composite material), for example, whereas in other examples the load spreader 602 is constructed of a different material. In some examples, the load spreader 602 can be disposed at a distance away from the first end wall 206 to provide space for other battery elements (e.g., an adjuster tie rod, a bus bar, a bus bar connector) and/or battery management electronics (e.g., a sensor, logic circuitry, etc.). In some examples, the battery cells 404 are disposed between the load spreader 602 and the second end wall 208 (FIG. 2B) of the enclosure 200. Thus, the load spreader 602 can form a means to at least partially compress the battery cells 404 disposed between the load spreader 602 and the second end wall 208 (FIG. 2B) of the enclosure 200 to maintain pressure on the battery cells 404 after the battery cells 404 are installed into the cavity 212 of the enclosure 200. In some examples, the first adjuster tie rod 603 is disposed between the first end wall 206 of the enclosure 200 and the load spreader 602. The example first adjuster tie rod 603 can be threaded to enable bi-directional adjustment of the position of the load spreader 602 within the cavity 212. For example, if additional pressure is to be applied to the battery cells 404, the adjuster tie rod 603 can be rotated to move the load spreader 602 in the direction of the second end wall 208 (FIG. 2B), away from the first end wall 206, to increase compression of the battery cells 404 between the load spreader 602 and the second end wall 208. In some examples, the battery 400 can include more than one adjuster tie rod, for example the second adjuster tie rod 604 and/or the third adjuster tie rod 605 as shown in FIGS. 6A and 6B. Examples disclosed herein, can include other numbers of adjuster tie rods disposed inside of the cavity 212 between the first end wall 206 and the load spreader 602. The example adjuster tie rods 603, 604, 605 of FIGS. 6A and 6B are spaced apart in a triangular orientation whereas, in other examples, the adjuster tie rods 603, 604, 605 can have other orientations. For example, if a battery includes four adjuster tie rods, the adjuster tie rods can be spaced apart in a square shape pattern between the first end wall 206 and the load spreader 602. As shown in FIGS. 6A and 6B, each of the adjuster tie rods 603, 604, 605 includes a nut 610 (forming a first end of the adjuster tie rod) and a foot 614 (forming a second end of the adjuster tie rod) with a threaded shaft. Each foot 614 is movable relative to the nut 610 when the nut 610 is rotated. The nuts 610 are coupled to (e.g., engaged with) the first end wall 206 of the enclosure 200, while the feet 614 are coupled to (e.g., engaged with) the load spreader 602. The nuts 610 can be rotated (e.g., using a tool such as a wrench) to move the feet 614 toward or away from the nuts 610, thereby moving the load spreader 602 away from the first end wall 206 to compress the battery cells 404, or relieving pressure to enable the load spreader 602 to move toward the first end wall 206. In some examples, one or more shims can be placed between the adjuster tie rods 603, 604, 605 and the load spreader 602. In some examples, the thickness and/or diameter of the feet 614 can be different. After the installation of the battery cells 404 into the enclosure 200, the adjustment of the adjuster tie rods 603, 604, 605 alters the pressure applied to the battery cells 404 within the enclosure 200. The compression of the battery cells 404 within the enclosure 200 enables stability of the battery cells 404 which reduces opportunities for a thermal runaway event to develop in the battery 400.

Figure 7A:
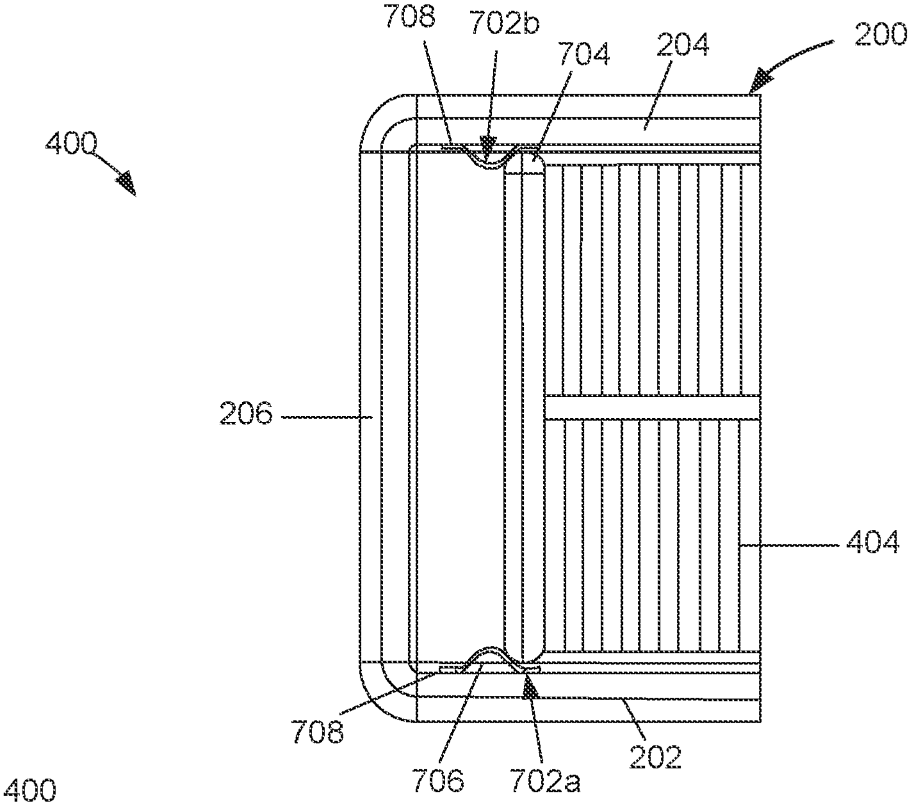
FIGS. 7A and 7B are top and top-right perspective views of the example battery FIG. 4A including ribs and a load spreader.
Figure 7B:
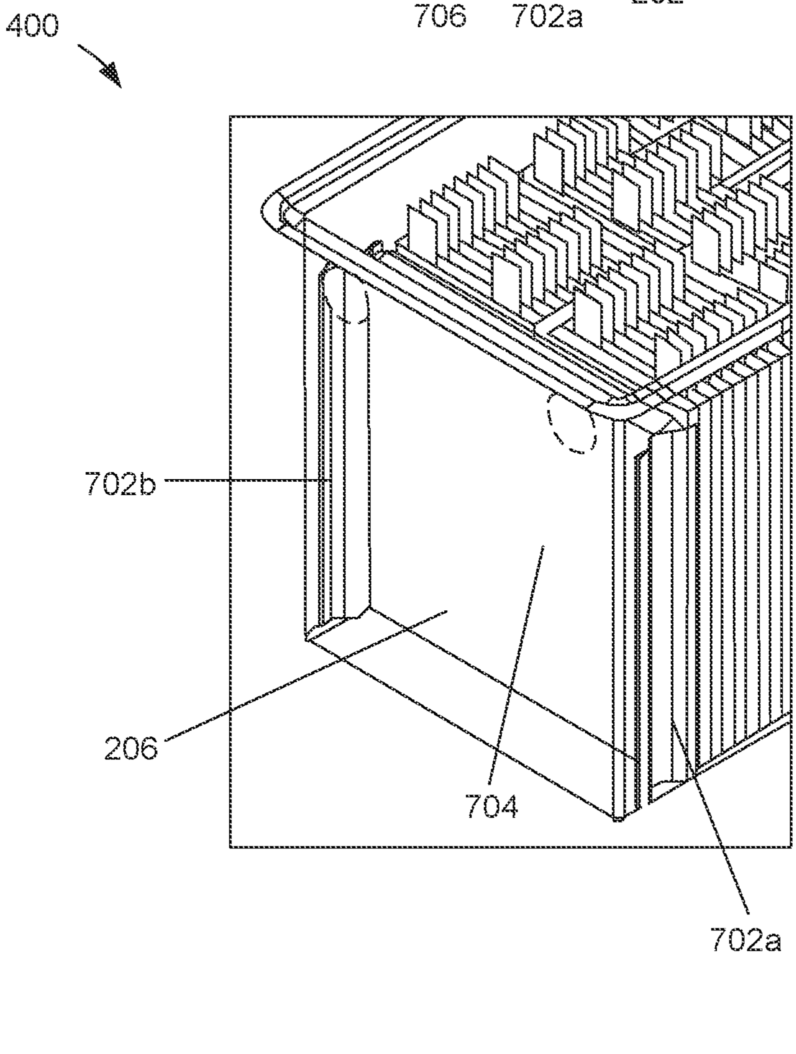

FIGS. 7A and 7B illustrate top and top-right perspective views of the example battery 400 of FIG. 4A that can be implemented by the aircraft 100 of FIG. 1 using ribs 702*a*, 702*b* and a load spreader 704 to compress the battery cells 404 inside of the enclosure 200. In FIGS. 7A-7B, the bus bars 420, 422 and bus bar connectors 426, 428 (indicated by dashed lines) shown in FIG. 4A have been removed. However, it is understood that these elements are included in the example battery of FIGS. 7A and 7B. FIG. 7A shows the top perspective view of a portion of the example battery 400 including the ribs 702*a*, 702*b* and the load spreader 704 to compress the battery cells 404 within the enclosure 200. FIG. 7B shows the top-right perspective view of a portion of the example battery 400 including the ribs 702*a*, 702*b* and the load spreader 704 to compress the battery cells 404 within the enclosure 200. The example battery 400 can include a first rib 702*a* and/or a second rib 702*b* disposed inside of the enclosure 200 as an alternative to the adjuster tie rods 603, 604, 605 (FIGS. 6A and 6B) to apply and/or maintain pressure on the load spreader 702. Examples disclosed herein include the first rib 702*a* coupled to the first sidewall 202 of the enclosure 200 and the second rib 702*b* coupled to the second sidewall 204 of the enclosure 200. In some examples, the ribs 702*a*, 702*b* can be curved in a semi-circular shape, where the curved surface 706 of the ribs 702*a*, 702*b* faces the first and second sidewalls 202, 204, respectively. The curved surface 706 of the ribs 702*a*, 702*b* flattens into a panel 708 on both sides of the curvature to overlay and mate with the first and second sidewalls 202, 204. In this example, the flat panel 708 on each side of the curved surface 706 of the ribs 702*a*, 702*b* couples the ribs 702*a*, 702*b* to the first and second sidewalls 202, 204, respectively. As such, the load spreader 704 is engaged with the flat panel 708 of the ribs 702*a*, 702*b* to maintain the load spreader 704 in a position to at least partially compress the battery cells 404 disposed between the load spreader 704 and the second end wall (FIG. 2A) of the enclosure 200 and/or to increase stability of the battery cells 404 in the cavity 212. In other examples, the ribs 702*a*, 702*b*, can have different configurations such as a triangular shape, for example. In some examples, the ribs 702*a*, 702*b* can enable the load spreader 704 to be disposed at a distance away from the first end wall 206 to form a space for battery elements (e.g., a bus bar, a bus connector, etc.). In some examples, the ribs 702*a*, 702*b* are constructed of nickel-chromium alloy (e.g., Inconel® alloy) whereas in other examples the ribs 702*a*, 702*b* can be constructed of stainless steel (e.g., 316 stainless steel). In some examples, the ribs 702*a*, 702*b* can be welded into the enclosure 200 after manufacture and/or assembly of the enclosure 200. In some examples, after the battery cells 404 are installed into the enclosure 200 under pressure, the load spreader 704 is installed between the battery cells 404 and the ribs 702*a*, 702*b*. It is understood that the load spreader 704 is substantially similar to the load spreader 602 of FIGS. 6A-6B.

Figure 8A:
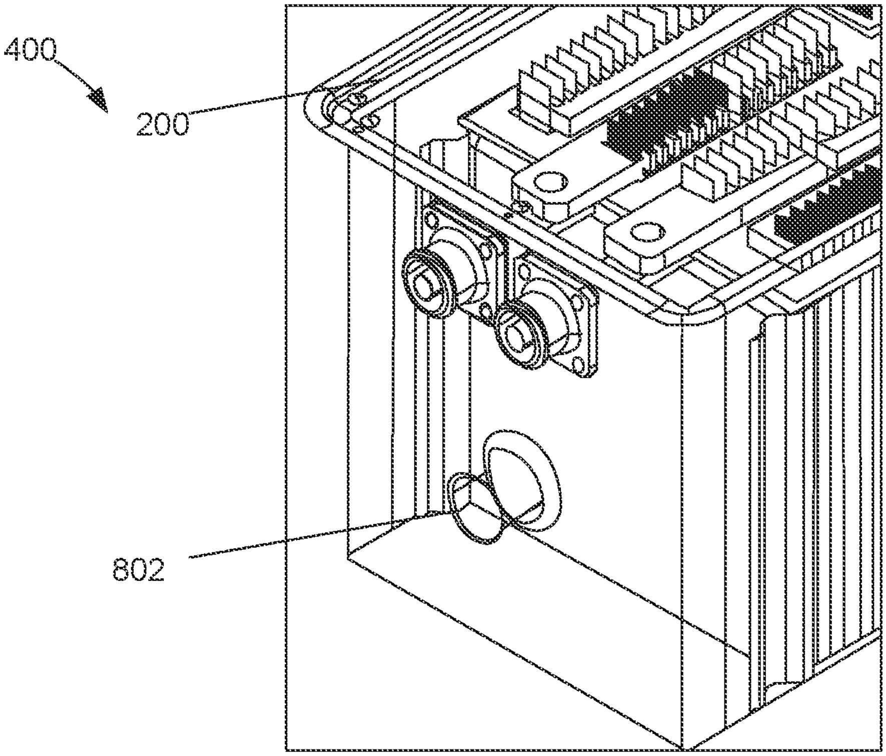
FIGS. 8A and 8B are top-right perspective views of a portion of batteries of FIGS. 4A and 4B, respectively, including an opening to couple to an exhaust duct.
Figure 8B:
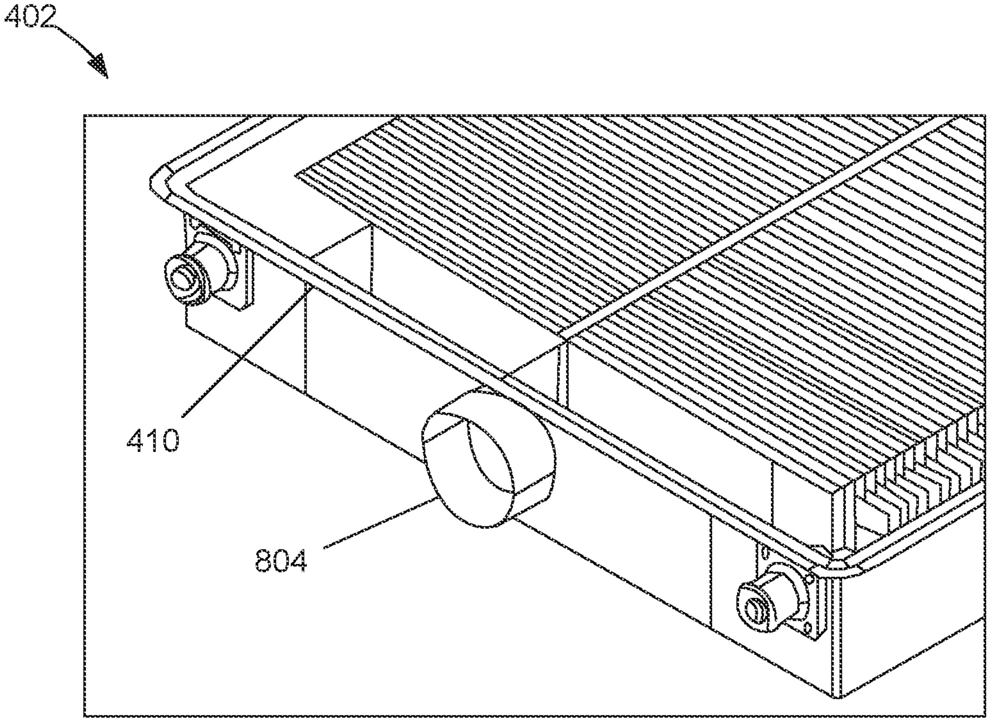

During a thermal runaway event, pressure inside of a battery can increase and, if not controlled, can cause the battery to erupt. Therefore, to mitigate eruption of the battery, examples disclosed herein provide example exhaust ducts for releasing pressurized fluid and/or gas from the battery during a thermal runaway event. FIGS. 8A and 8B illustrate top-right perspective views of a portion of the batteries 400 and 402 of FIGS. 4A-4B, respectively, including an opening 802, 804 to enable coupling to an example exhaust duct. In this example, the openings 802, 804 can couple a vent, or exhaust duct, to the enclosures 200, 410, respectively, to enable pressure equalization and/or release of fluid or gas during a thermal runaway event in the battery 400, 402. As shown in FIGS. 8A-8B, the opening 802, 804 can be disposed on the first end wall 206, 412 of the example enclosures 200, 410. In other examples, the opening 802, 804 can be disposed on a different sidewall and/or end wall of the enclosure 200, 410. In some examples, the opening 802, 804 can couple a vent, or exhaust duct, (shown in FIGS. 9A and 9B) external to the battery 400, 402. In other examples, the enclosure 200, 410 can include more than one opening 802, 804 to couple more than one exhaust duct to the battery 400, 402.

Figure 9A:
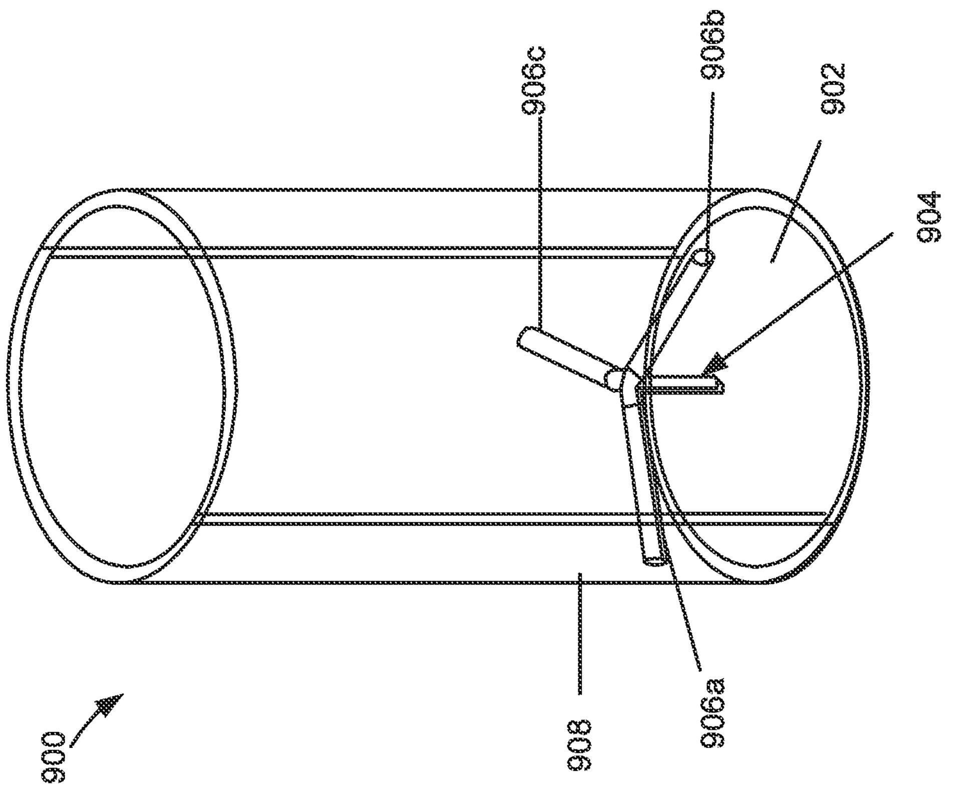
FIG. 9A is a top-perspective view of an example exhaust duct.
Figure 9B:
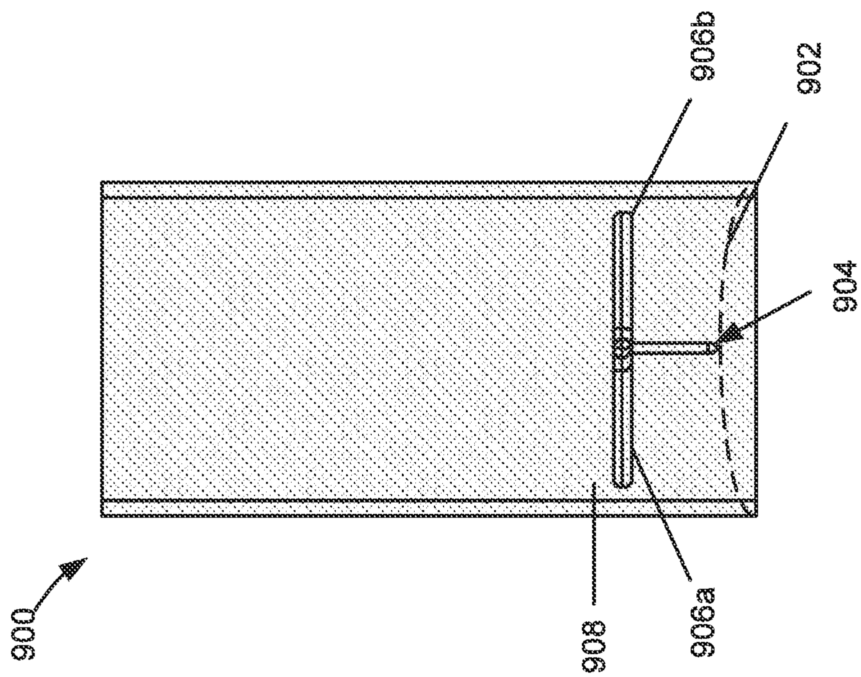
FIG. 9B a cross-sectional view of the example exhaust duct of FIG. 9A taken down an A-A line.

FIG. 9A illustrates a top-perspective view of an example exhaust duct 900 that can be coupled to the enclosures 200, 410 of FIGS. 4A-4B as described above. FIG. 9B illustrates a cross-sectional view of the example exhaust duct 900. In some examples, the exhaust duct 900 is coupled to the opening 800, 802 (FIGS. 8A and 8B) of the enclosure 200, 410 and thus is external to the battery 400, 402. As shown in FIGS. 9A and 9B, the exhaust duct 900 is cylindrical in shape whereas, in other examples, the exhaust duct 900 can have different geometries. Examples disclosed herein include a diaphragm 902 disposed inside of the exhaust duct 900. As such, the diaphragm 902 is coupled to the first end wall 206, 412 of the enclosure 200, 410 and, thus, covers the opening 802, 804, respectively. In this example, the exhaust duct 900 includes a puncture pin 904 disposed inside of the exhaust duct 900. The example puncture pin 904 has three support pins 906*a*, 906*b*, 906*c*, that couple to the interior surface 908 of the exhaust duct 900 to support and hold the puncture pin 904 in place relative to the diaphragm. In other examples, the puncture pin 904 can have a different number of support pins 906*a*-906*c*. The puncture pin can 904 can be constructed of a material such as a plastic that can withstand high temperatures. In this example, the puncture pin 904 is disposed outside of the enclosure 200, 410 and adjacent the diaphragm 902. When pressure increases inside of the cavity 212, 408 of the enclosure 200, 410, the diaphragm 902 extends outward to make contact with the puncture pin 904 to cause the puncturing or piercing of the diaphragm 902 as seen in FIG. 9B. As such, during a thermal runaway event in a battery 400, 402, the puncturing of the diaphragm 902 by the puncture pin 904 enables pressure (e.g., gas and/or fluid accumulation) to evacuate the cavity 212, 408 of the battery 400, 402 when the pressure inside of the enclosure 200, 410 exceeds a threshold. The venting of the pressurized fluid and/or gas from the battery 400, 402 thus reduces the likelihood of eruption of the battery 400, 402.

In some examples, the diaphragm 902 is constructed of a non-woven material such as polytetrafluoroethylene (Porex® PTFE), for example. In some examples, the diaphragm 902 can prevent debris and/or water from entering the enclosure 200, 410 of the battery 400, 402, respectively. In other examples, the diaphragm 902 is constructed of other materials to form a flexible membrane to enable puncture by the example puncture pin 904. Thus, in some examples, when the diaphragm 902 is punctured by the puncture pin 904, during a thermal runaway event for example, the exhaust duct 900 can direct pressurized fluid disposed inside of the battery 400, 402 from the cavity 212, 408 to a downstream location outside of the battery 400, 402. The example exhaust duct 900 can therefore mitigate eruption of the battery 400, 402 during a thermal runaway event.

Figure 10:
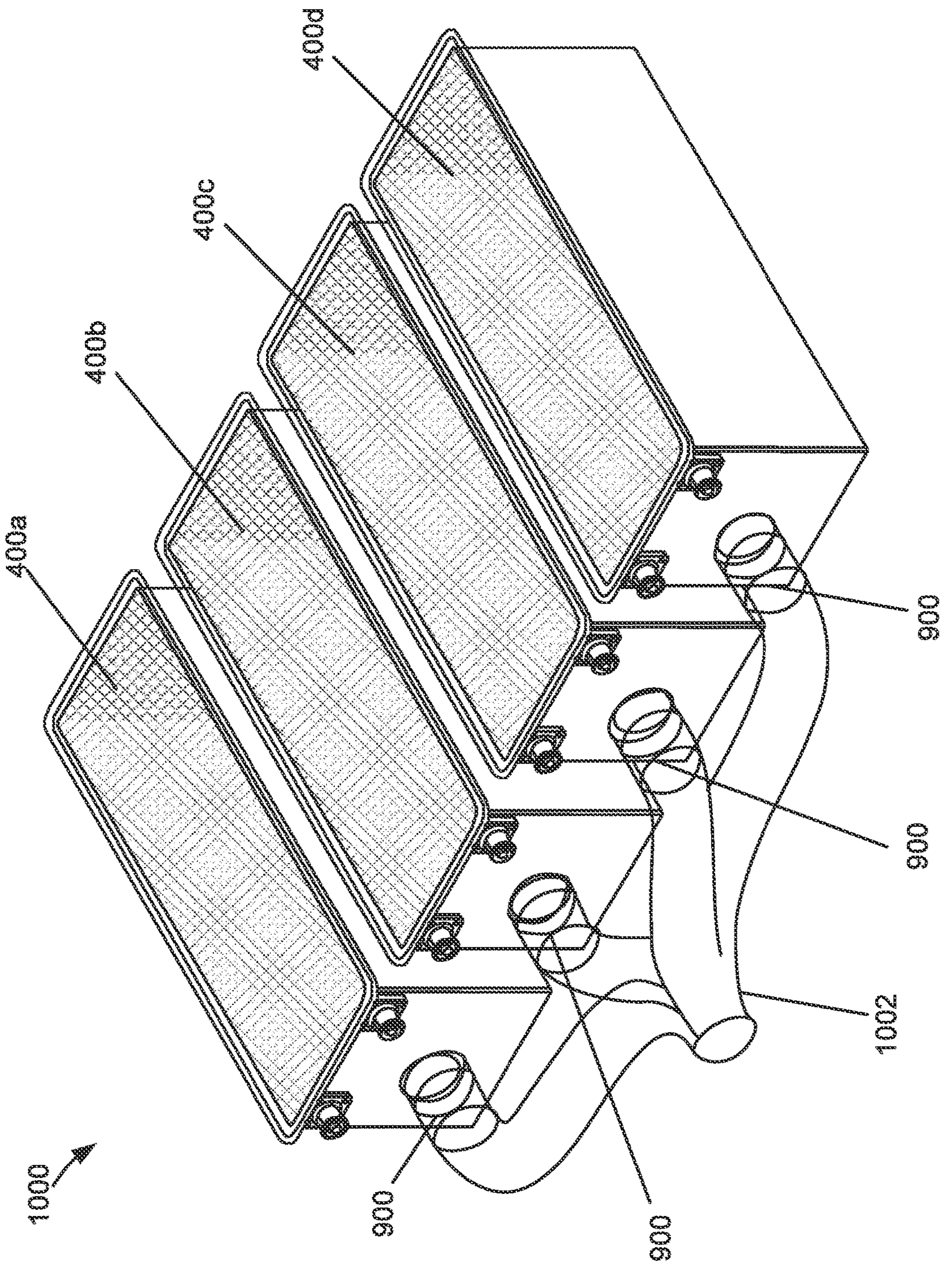
FIG. 10 is a top-right perspective view of an example battery system including a plurality of example batteries of FIG. 4A connected by a manifold.

FIG. 10 illustrates a top-right perspective view of an example battery system 1000 including a plurality of example batteries 400*a*, 400*b*, 400*c*, 400*d*, each of which are substantially the same as the battery 400 of FIG. 4A, connected by a manifold 1002. As shown in FIG. 10, an exhaust duct 900 extends from the opening 802 (FIG. 8A) of the enclosure 200 of each of the batteries 400*a-d*. In this example the exhaust ducts 900 are connected to a manifold 1002 to form the example battery system 1000 that can be implemented in the example aircraft 100 of FIG. 1. As such, the manifold 1002 couples the exhaust duct 900 of each battery 400*a*-400*d*. The manifold 1002 can thus direct pressurized gas and/or fluid from one or more of the batteries 400*a*-400*d* to a downstream location inside or outside of the body 108 of the aircraft 100 during a thermal runaway event.

During a temperature increase of a battery, facilitating thermal management within the battery environment is important for mitigating a thermal runaway event, and therefore, battery failure. Examples disclosed herein describe several cooling mechanisms for achieving thermal management of a battery during a thermal runaway event or during an increase in battery temperature. The examples disclosed herein can be combined into a single example batteries implemented separately, or be implemented in any combinations thereof.

Figure 11:
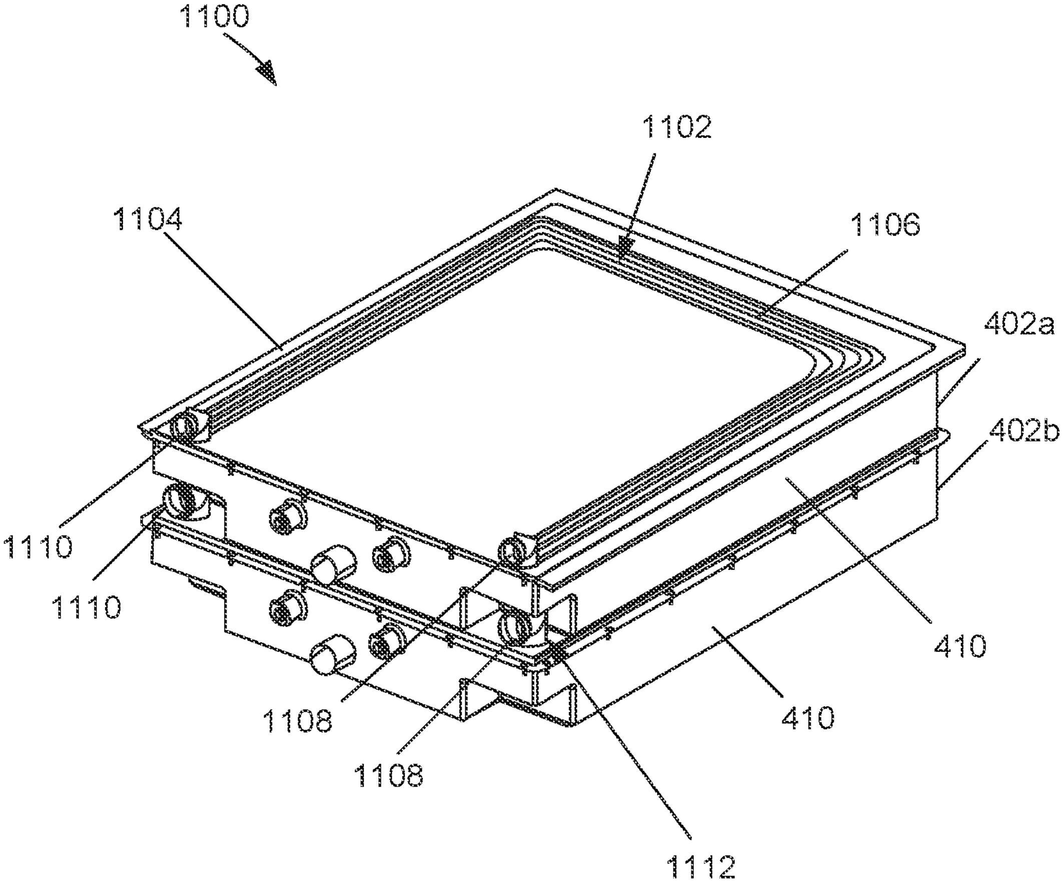
FIG. 11 is a top-perspective view of a battery system of example batteries of FIG. 4B including an external cooling plate.

FIG. 11 illustrates a top-right perspective view of a battery system 1100 including the example batteries 402*a*, 402*b* implemented using the battery 402 of FIG. 4B. The battery system 1100 can include an external 1102, disposed on a top 1104 of the enclosure 410 to engage with the first and second sidewalls and/or first and second end walls (FIGS. 4A and 4B) of the enclosure 410. In some examples, the external cooling plate 1102 can include a fluid channel 1106 between an inlet port 1108 and an outlet port 1110 disposed in the external cooling plate 1102. For example, if a temperature of the battery 402*a* rises, a cooling fluid can be pumped through the inlet port 1108 of the external cooling plate 1102 to circulate through the fluid channel 1106 and exit through the outlet port 1110 to reduce the temperature of the battery cells 406 inside if the enclosure 410 (FIG. 4B) and, thus, the battery 402*a*. The cooling fluid can be a non-conductive dielectric fluid (e.g., propylene glycol, ethylene glycol, etc.).

In this example, an external cooling plate 1102 is disposed between two adjacent batteries 402*a* and 402*b*. As shown by FIG. 11, the batteries 402*a* and 402*b* can be stacked and, thus, the external cooling plate 1102 can engage with the top 1104 (e.g., a lid) of a battery and/or a bottom of a second battery disposed on top of the first battery. The example external cooling plate 1102 can lay flat on the top 1104 of the enclosure 410 to enable batteries to be stacked on top of each other as shown in FIG. 11. In some examples, the system 1100 includes multiple batteries 402 and multiple cooling plates 1102, where the batteries 402 are arranged in a stack, and respective ones of the cooling plates 1102 are disposed between respective ones of the batteries 402. It is to be understood that inlet and outlet ports 1108, 1110 are components of the external cooling plate 1102 disposed on the top 1104 of the enclosure 410 and of an external cooling plate 1112 disposed between batteries 402*a* and 402*b* of FIG. 11.

In some examples, the external cooling plate 1102 coupled to horizontally oriented batteries can be advantageous compared to applying an external cooling plate to vertically oriented batteries depending on the design requirements and available space in the aircraft 100. However, another advantage of this application of the external cooling plates 1102, 1112 to horizontally oriented batteries 402*a*, 402*b* is improving cell cooling. In particular, this battery design enables the external cooling plates 1102, 1112 to make contact with the longer axis of each battery cell 406 disposed in the enclosure 410, thus cooling each battery cell 406 faster. Also, stacking batteries as seen in FIG. 11 enables the external cooling plate 1112 to contact the top and bottom of each battery enclosure in the system, thereby improving thermal contact within the battery system. In other examples, the example batteries of FIG. 11 can have an internal cooling plate disposed inside of the enclosure 410 to engage with the top of the battery cells 406 to facilitate thermal management of the battery 402*a*, 402*b*. Thus, using an internal cooling plate can decouple the batteries of the battery system to mitigate thermal runaway propagation across batteries.

Figure 12:
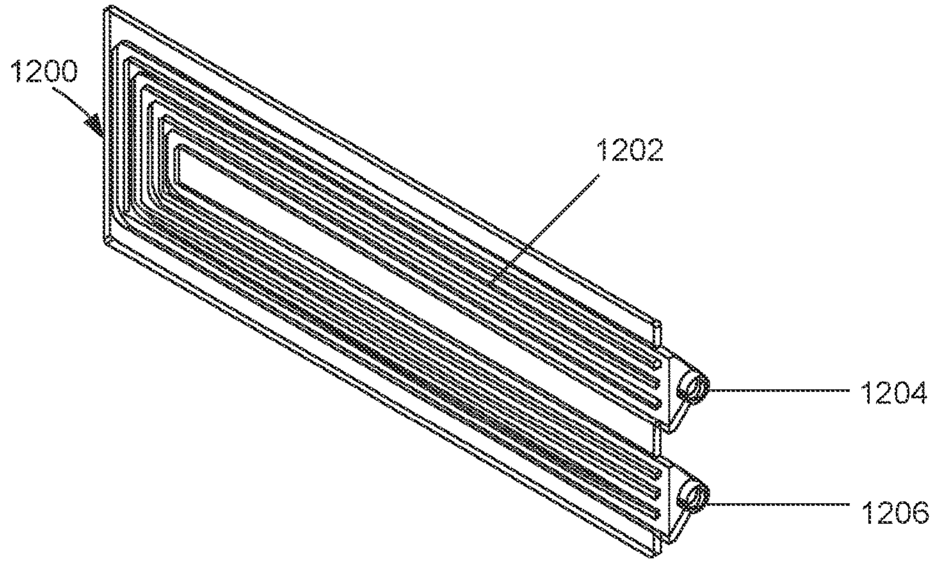
FIG. 12 is a top-left perspective view of an example center cooling plate.

Alternative examples for mitigating a thermal runaway event can be implemented by the example battery 400 of FIG. 4A in which the battery cells 404 are oriented vertically in the cavity 212 of the enclosure 200. FIG. 12 illustrates a top-left perspective view of an example center cooling plate 1200. In some examples, the center cooling plate 1200 can include one or more fluid channels 1202 disposed between an inlet port 1204 and an outlet port 1206. In some examples, the center cooling plate 1200 can be constructed of a metal (e.g., stainless steel, nickel-chromium alloy, etc.) or other material and/or can have alternate geometries than the one shown in FIG. 12. The center cooling plate 1200 can be cast or constructed by additive manufacturing, for example.

Figure 13:
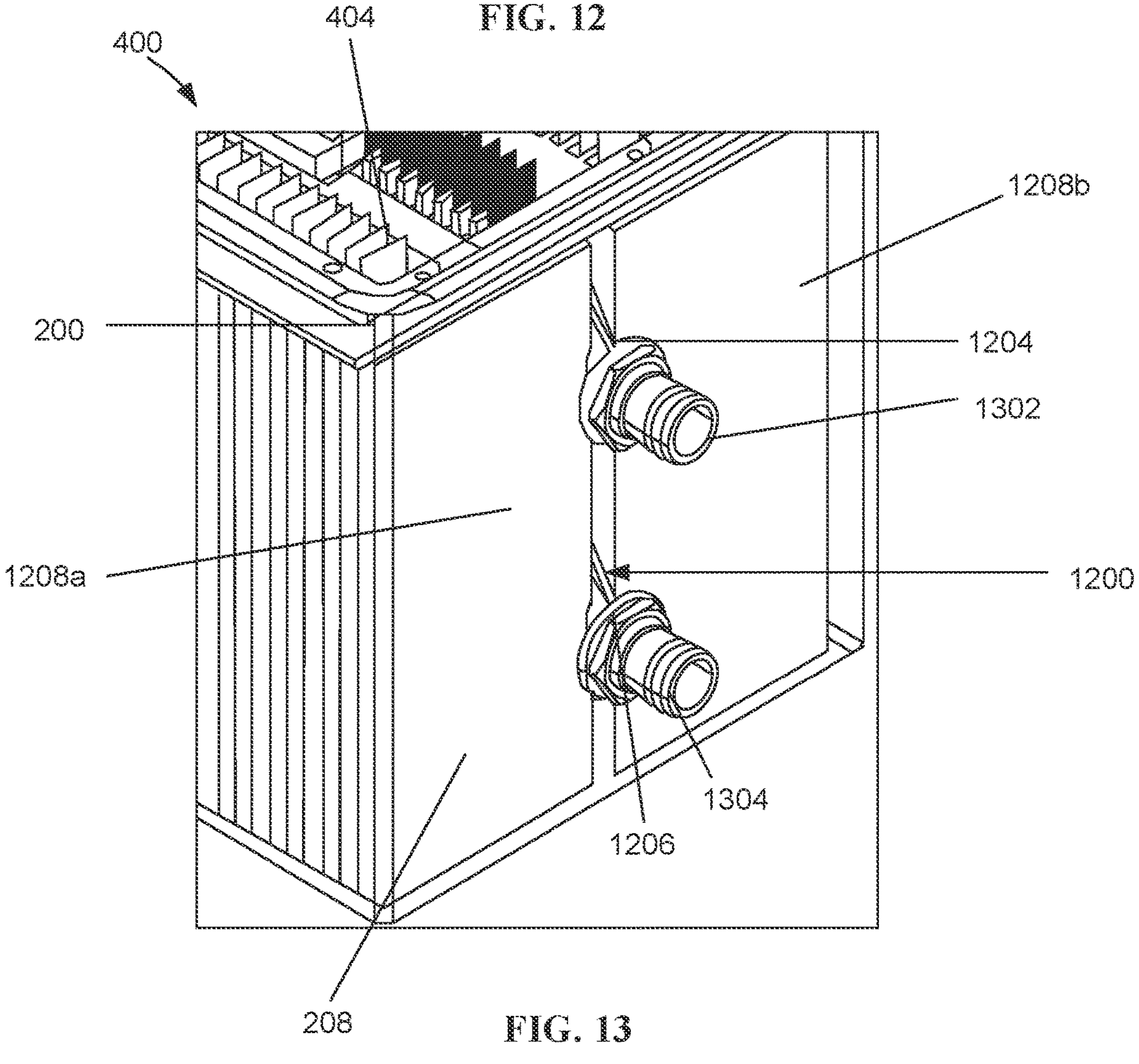
FIG. 13 is a view of the center cooling plate of FIG. 12 disposed between the two adjacent rows of battery cells inside of the battery of FIG. 4A.

FIG. 13 is a view of the center cooling plate of FIG. 12 disposed between two adjacent rows of battery cells inside of the battery of FIG. 4A. As shown in FIG. 13, the center cooling plate 1200 can be disposed along the center of the example battery 400 between two adjacent rows of battery cells 1208*a*, 1208*b* inside of the enclosure 200. Thus, the cooling plate 1200 can be at least partially disposed in the cavity 212 of the enclosure 200 and engage with the battery cells 404. As shown by FIG. 13, the enclosure 200 of the battery 400 of FIG. 4A includes an inlet port 1302 and/or an outlet port 1304 (e.g., an opening in the enclosure) to enable the inlet and outlet ports 1204, 1206 of the center cooling plate 1200 to extend through the end wall 208 of the enclosure 200. As shown in FIG. 13, the inlet and/or outlet ports 1204, 1206 of the center cooling plate 1200 extend out of the second end wall 208 of the enclosure 200. In other examples, the center cooling plate 1200 can be oriented so that the inlet and/or outlet ports 1204, 1206 extend through the first end wall 206, or the first and/or second sidewalls 202, 204. In this example, the inlet and/or outlet ports 1302, 1304 of the enclosure 200 align with the inlet and/or outlet ports 1204, 1206 of the center fluid channel 1200. The inlet and/or outlet port 1204, 1206 of the center cooling plate 1200 can be hermetically sealed to the enclosure 200 at each inlet and/or outlet ports 1302, 1304, respectively. In some examples, an external fluid circuit can be coupled to the inlet and/or outlet ports 1302, 1304 to pump a cooling fluid through the fluid channel 1202 of the center cooling plate 1200.

Figure 14:
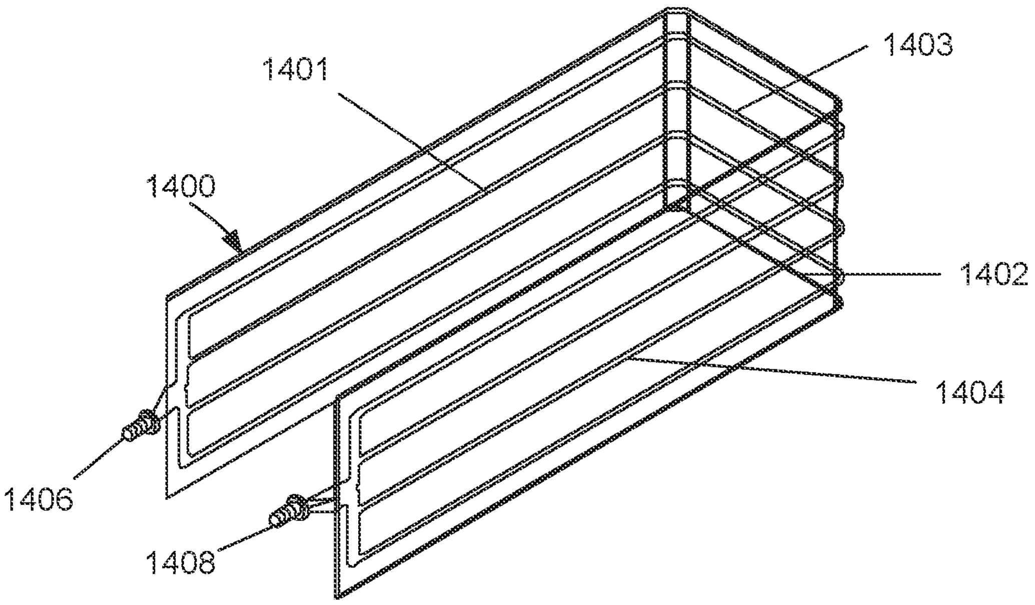
FIG. 14 is a top-perspective view of an example wrap-around cooling plate.
Figure 15:
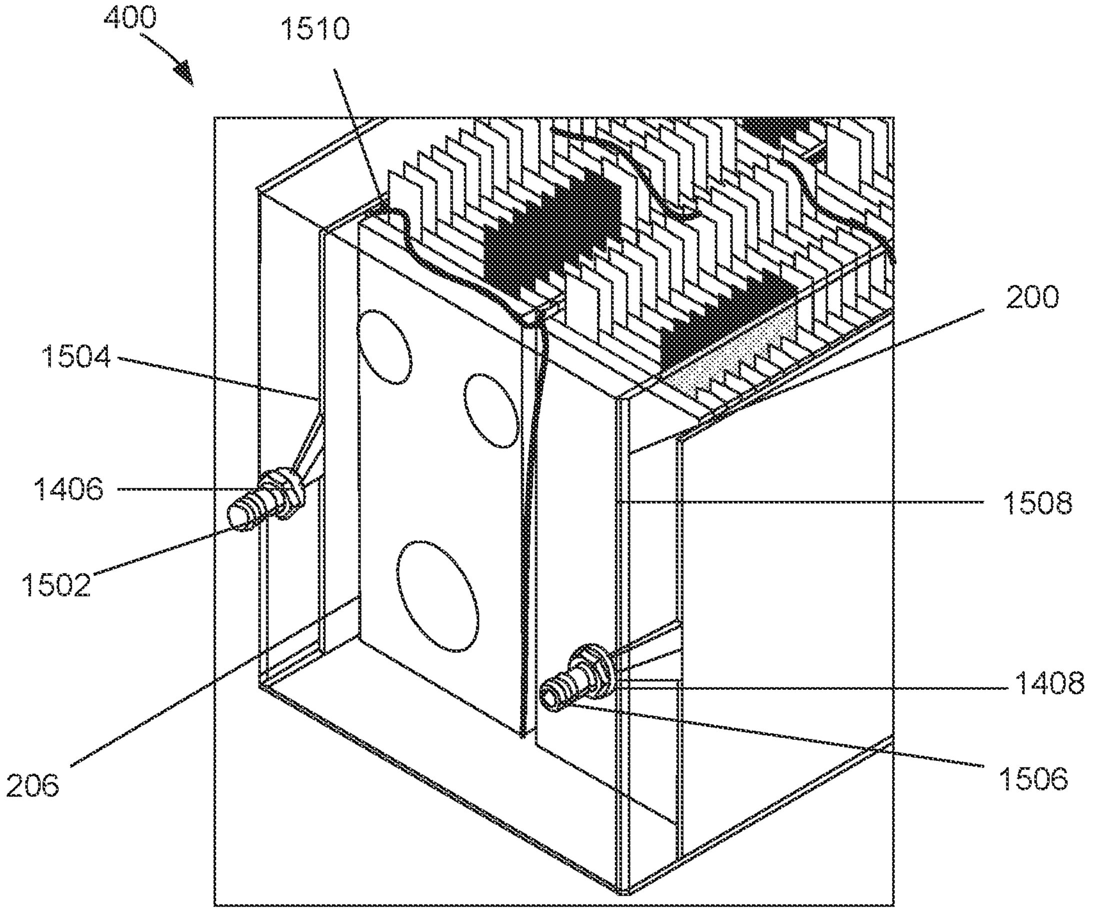
FIG. 15 is a view of a portion of an example battery of FIG. 4A including the wrap-around cooling plate of FIG. 14 disposed inside of the battery.

FIGS. 14 and 15 illustrate an alternate example cooling mechanism for facilitating thermal management in the example battery 400 of FIG. 4A. FIG. 14 shows a top-right perspective view of an example wrap-around cooling plate 1400. FIG. 15 is a view of a portion of the example battery 400 of FIG. 4A including the wrap-around cooling plate 1400 of FIG. 14 disposed inside of the battery 400. As shown in FIG. 15, the wrap-around cooling plate 1400 can be disposed inside of the enclosure 200 to traverse along the first and second sidewalls 202, 204 and second end wall 208 of the enclosure 200. The wrap-around cooling plate 1400 can at least partially surround the battery cells 404 within the enclosure 200 and, thus, engage with the battery cells 404 disposed in the cavity 212 and/or a first and second sidewall 202, 204 and/or second end wall 208, of the enclosure 200. In some examples, the wrap-around cooling plate 1400 has two substantially linear portions 1401, 1402 connected by an arcuate portion 1403, where the linear portions 1401, 1402 are substantially parallel to each other. As such, the example wrap-around cooling plate 1400 can be constructed by metal casting, extrusion manufacturing, or additive manufacturing, for example, and made of a material such as stainless steel and/or aluminum (which may be advantageous for having high thermal conductivity). Returning to FIG. 14, the wrap-around cooling plate 1400 includes a fluid channel 1404. In some examples, the fluid channel 1404 can include one or more fluid channels disposed between an inlet port 1406 and an outlet port 1408. The battery 400 of FIG. 15 is the battery 400 of FIG. 4A with elements removed (e.g., bus bars 420, 422, bus bar connectors 426, 428, vent opening 802). As shown in FIG. 15, the example enclosure 200 can have an inlet port 1502 disposed on a first side 1504 of the first end wall 206 to couple with the inlet port 1406 of the wrap-around cooling plate 1400 and an outlet port 1506 disposed on a second side 1508 of the first end wall 206 the second side 1508 opposite the first side 1504 to couple with the outlet port 1408 of the wrap-around cooling plate 1400. The inlet and/or outlet port 1406, 1408 of the wrap-around cooling plate 1400 can be hermetically sealed to the inlet and/or outlet port 1502, 1506 of the enclosure 200. In other examples, the wrap-around cooling plate 1400 can be oriented so that the inlet and/or outlet ports 1406, 1408 extend out of the second end wall 208 (e.g., the back) of the enclosure 200 to enable the wrap around cooling plate 1400 to engage with the first and second sidewalls 202, 204 and first end wall 206 of the enclosure 200.

In some examples, the batteries 400 disclosed herein can include one or more flexible graphite sheets 1510 (e.g., a NeoGraf™ sheet, etc.) disposed between individual battery cells 404. The flexible graphite sheets 1510 can engage with at least one of the first and second sidewalls 202, 204 and/or first and second end walls 206, 208 of the enclosure 200 and a cooling plate (e.g., a wrap-around cooling plate 1400). In other examples, a single flexible graphite sheet 1510 can be disposed between two or more rows of battery cells 404 to traverse the enclosure 200 from the first end wall 206 to the second end wall 208 of the enclosure 200. As such, the flexible graphite sheets 1510 can transfer heat away from the battery cells 404 to a proximate cooling plate, for example the wrap-around cooling plate 1400 as seen in FIG. 15. The use of the graphite sheets 1510 for heat spreading can decrease the weight of the battery 400. In other examples, the cavity 212 of the enclosure 200 can include an energy absorption material such as microencapsulated phase change material (PCM) (e.g., microgranules, a powder, a fluid, etc.) or a dielectric cooling fluid, for example, to absorb heat and facilitate a reduction of battery temperature. During a battery temperature increase, the material can undergo a phase change from liquid to gaseous, for example and evaporate. The evaporated fluid can then condense on the battery cells to reduce the temperature of the battery cells 404 for thermal management of the battery 400.

Figure 16:
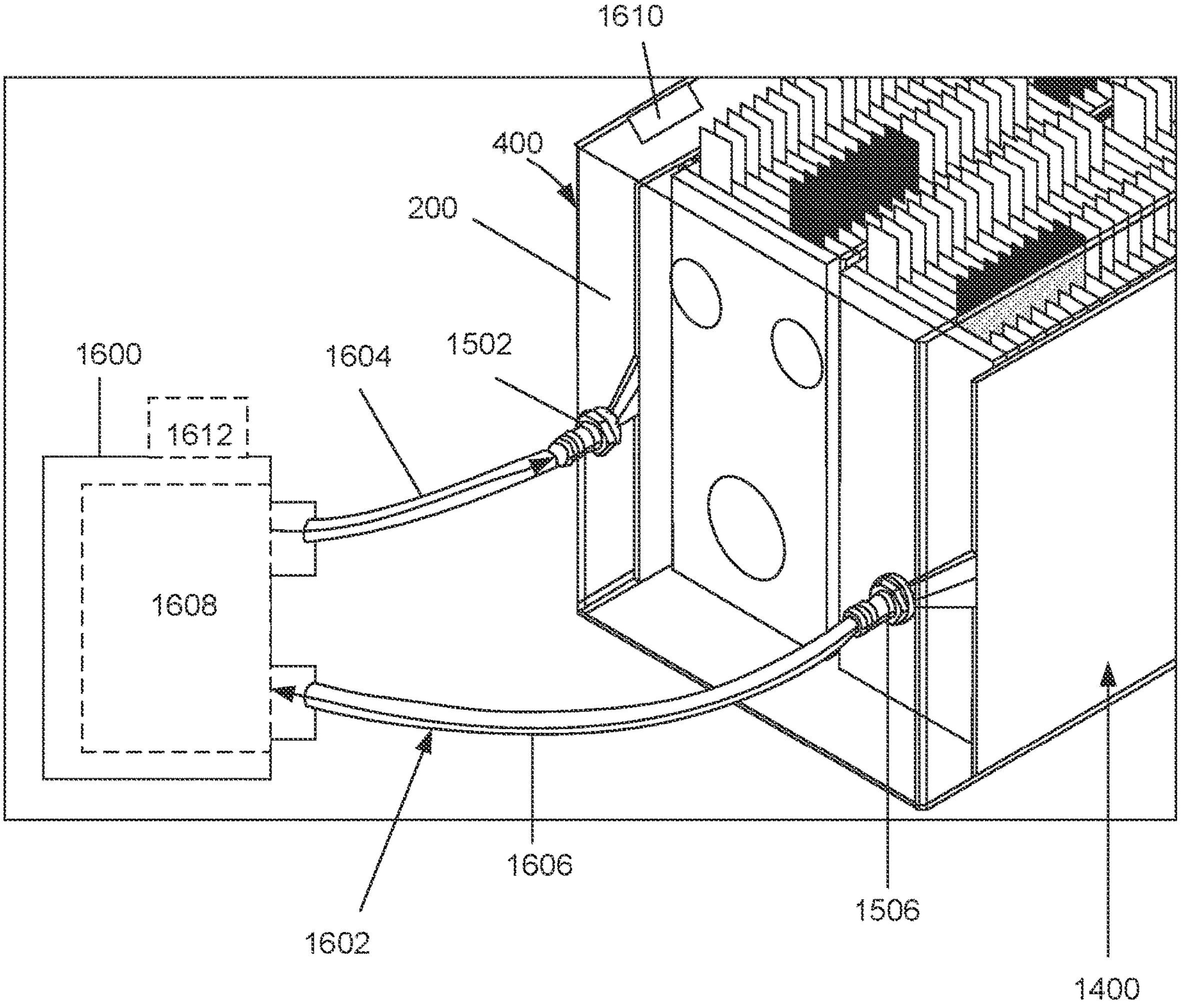
FIG. 16 is the battery of FIG. 15 connected to a fluid pump.

FIG. 16 shows the battery 400 and wrap-around cooling plate 1400 of FIG. 15 connected to a fluid pump 1600. In this example, the inlet and outlet ports 1502, 1506 of the enclosure 200 can enable coupling to the external fluid pump 1600. The fluid pump 1600 can circulate a cooling fluid 1602 into a second input fluid channel 1604 coupled to the input port 1502 of the enclosure 200 and through the fluid channel 1404 of the wrap-around cooling plate 1400 to reduce the temperature of the battery 400. The cooling fluid 1602 can then exit the wrap-around cooling plate 1400 via a second output fluid channel 1606 coupled to the outlet port 1506 of the enclosure 200 to return to a fluid reservoir 1608 in the fluid pump 1600. In this example, a temperature sensor 1610 is disposed inside of the enclosure 200 to measure the temperature inside of the enclosure 200. In some examples, the temperature sensor 1610 can measure the temperature at all times that the battery 400 is in use or at time intervals. In this example, the fluid pump 1600 includes a controller 1612 to activate the fluid pump 1600 to pump or circulate the cooling fluid 1602 through the cooling plate 1400 when the temperature inside of the enclosure 200 exceeds a threshold temperature. As such, the controller 1612 can deactivate the fluid pump 1600 when the temperature inside of the enclosure 200 is below the threshold temperature.

Figure 17:
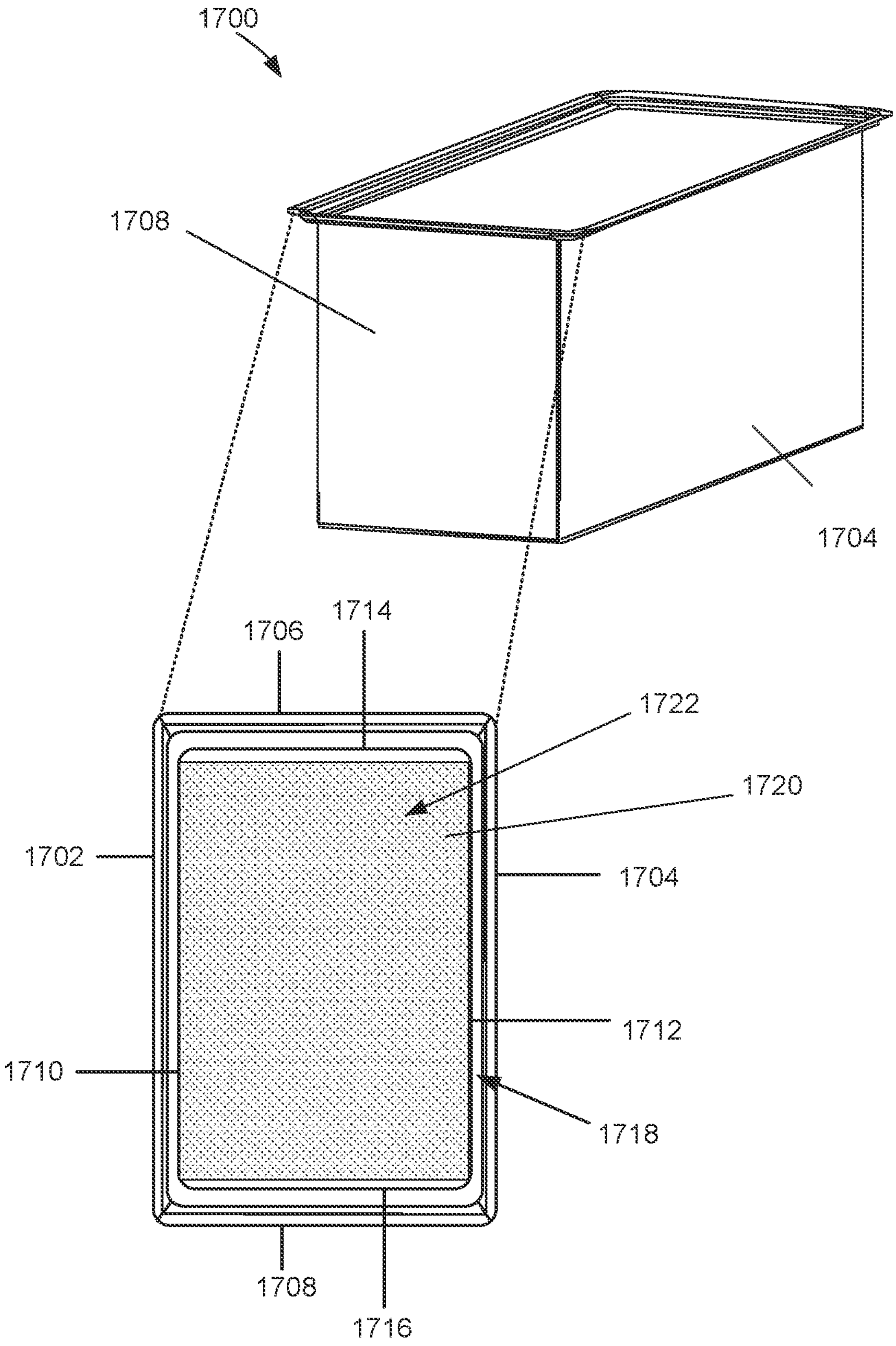
FIG. 17 shows a top-perspective and top view of an example double-walled enclosure for use in the example batteries of FIGS. 4A and 4B.

FIG. 17 shows a top-perspective and top view of an example double-walled enclosure 1700 for use with the example batteries 400, 402 disclosed herein. In some examples, the enclosure 1700 can have a second set of sidewalls and/or end walls disposed inside the first set of sidewalls and/or end walls. For example, a first set of walls can be sidewalls 1702, 1704 and end walls 1706 and 1708 to define the exterior enclosure. A second set of walls can be sidewalls 1710, 1712 and end walls 1714, 1716, that correspond to each sidewall and end wall of the exterior enclosure 1700. In some examples, the first and second set of sidewalls and/or end walls can be separated by a space 1718 to accept a cooling fluid. In other examples, the space 1718 disposed between a first set of side walls/end walls and a second set of sidewalls/end walls can accept an energy absorption material such as microencapsulated phase change material (PCM) (e.g., microgranules, a powder, a fluid, etc.) to absorb heat to facilitate a reduction of battery temperature in the battery. In other examples, the enclosure 1700, as well as enclosures 200 and 410 described above, can include an energy absorption material 1722 disposed inside a cavity 1720, and/or the cavities 212, 408. In FIG. 17, an example energy absorption material 1722 is shown as a shaded region in the cavity 1720 of enclosure 1700.

Figure 18:
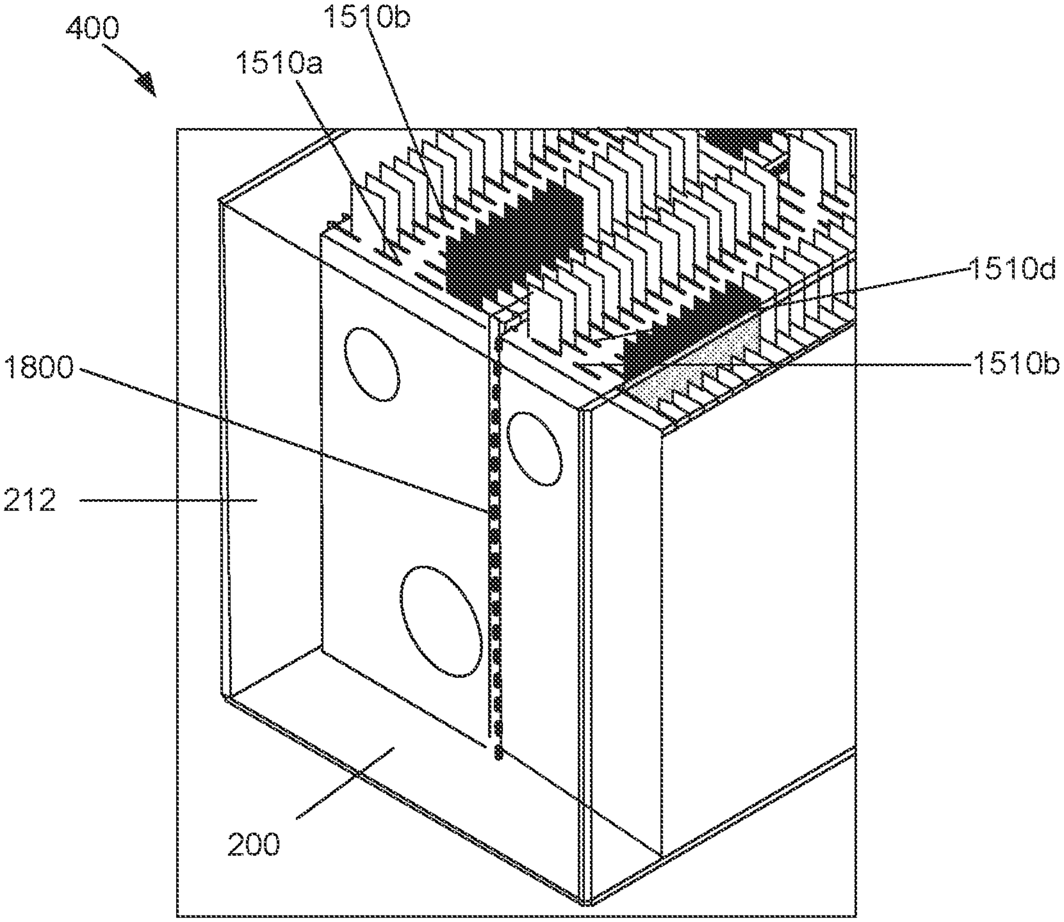
FIG. 18 is a top-perspective view of a portion of an example battery including graphite sheets and energy absorption material.

In some examples, more than one cooling mechanism or material can be disposed inside of the cavity 212 to facilitate cooling of the battery 400 during a thermal runaway event. FIG. 18 shows a portion of the battery 400 including graphite sheets 1510*a*, 1510*b*, 1510*c* (e.g., NeoGraf™), and 1510*d* and an energy absorption material 1800 disposed inside of the enclosure 200. As shown in FIG. 18, the graphite sheets 1510*a*-1510*d* (shown as dashed lines) are disposed between each of the battery cells 404, and a volume of energy absorption material 1800 (shown as a dotted line), such as microencapsulated PCM, is disposed in the cavity 212 and between the two rows of battery cells 404. As such, the flexible graphite sheets 1510*a*-1510*d* disposed between ones of the battery cells 404 in the enclosure 200 can conduct heat away from the battery cells 404 to the energy absorption material 1800.

Example methods, systems, apparatus, and articles of manufacture for mitigating a thermal runaway event of a battery have been disclosed herein. The following paragraphs provide various examples and example combinations of the examples disclosed herein.

Examples 1 is a battery including an enclosure defining a cavity, the enclosure including a first end wall and a second end wall opposite the first end wall, a battery cell disposed in the cavity of the enclosure, and a load spreader disposed in the cavity of the enclosure, the load spreader spaced from the first end wall, the battery cell disposed between the load spreader and the second end wall of the enclosure, the load spreader at least partially compressing the battery cell between the load spreader and the second end wall.

Example 2 includes the battery of Example 1, further including an adjuster tie rod disposed between the first end wall of the enclosure and the load spreader, the adjuster tie rod to adjust a position of the load spreader in the cavity.

Example 3 includes the battery of Example 2, the adjuster tie rod includes a nut and a foot that is movable relative to the nut when the nut is rotated.

Example 4 includes the battery of any of Examples 1-3, wherein the enclosure includes a first sidewall between the first and second end walls and a second sidewall between the first and second end walls opposite the first sidewall, the battery further including a first rib coupled to the first sidewall, and a second rib coupled to the second sidewall opposite the first rib, the load spreader engaged with the first and second ribs, the first and second ribs to maintain the load spreader in a location to at least partially compress the battery cell.

Example 5 includes the battery of Examples 4, wherein the first rib is welded to the first sidewall and the second rib is welded to the second sidewall.

Example 6 includes the battery of any of Examples 1-5, further including a plurality of battery cells between the load spreader and the second end wall.

Example 7 is a system including a battery. The battery includes a sealed enclosure defining a cavity. The system further includes a battery cell disposed in the cavity of the enclosure, and a cooling plate having a fluid channel between an inlet port and an outlet port, the cooling plate to reduce a temperature of the battery.

Example 8 includes the system of Example 7, wherein the enclosure is double walled.

Example 9 includes the system of Examples 7 or 8, further including multiple batteries and multiple cooling plates, the batteries arranged in a stack, respective ones of the cooling plates disposed between respective ones of the batteries.

Example 10 includes the system of any of Examples 7-9, wherein the battery includes an energy absorption material in the cavity of the enclosure.

Example 11 includes the system of Example 10, wherein the energy absorption material is a microencapsulated phase change material.

Example 12 includes the system of Examples 10 or 11, wherein the energy absorption material is a dielectric fluid.

Example 13 includes the system of any of Example 7-10, wherein the cooling plate is at least partially disposed in the cavity of the enclosure.

Example 14 includes the system of Example 13, wherein the inlet port and the outlet port of the cooling plate extend through respective openings formed in an end wall of the enclosure.

Example 15 includes the system of Examples 13 or 14, wherein the battery includes a plurality of battery cells disposed in the cavity of the enclosure, the battery cells arranged in a first row and a second row adjacent the first row, and wherein the cooling plate is disposed between the first and second rows.

Example 16 includes the system of any of Examples 13-15, wherein the battery includes a plurality of battery cells disposed in the cavity of the enclosure, and wherein the cooling plate has a first linear portion and a second linear portion connected by a third arcuate portion, the first linear portion parallel to the second linear portion, the cooling plate at least partially surrounding the battery cells.

Example 17 includes the system of Example 16, further including a flexible graphite sheet disposed between two of the battery cells, the flexible graphite sheet engaged with the cooling plate, the flexible graphite sheet to transfer heat from the two of the battery cells to the cooling plate.

Example 18 includes the system of any of Examples 7-17, and a temperature sensor to measure a temperature inside of the enclosure, a reservoir of cooling fluid, a pump, and a controller to activate the pump to pump the cooling fluid through the cooling plate when the temperature inside of the enclosure exceeds a threshold temperature.

Example 19 includes the system of Example 18, wherein the controller is to deactivate the pump when the temperature inside of the enclosure is below the threshold temperature.

Example 20 is a battery system including a battery, wherein the battery includes a sealed enclosure defining a cavity, the enclosure including an end wall with an opening formed in the end wall, a battery cell disposed in the cavity of the enclosure and a diaphragm coupled to the end wall and covering the opening. The battery system of Example 20 further includes a puncture pin disposed outside of the enclosure and adjacent the diaphragm such that when pressure increases in the cavity, the diaphragm flexes outward and is punctured by the puncture pin.

Example 21 includes the battery system of Example 20, further including an exhaust duct extending from the enclosure at the opening, the exhaust duct to direct pressurized fluid from the cavity to a downstream location when the diaphragm is punctured.

Example 22 includes the battery system of Example 21, wherein the puncture pin is disposed inside of the exhaust duct.

Examples 23 includes the battery system of any of Examples 20-23, wherein the battery is a first battery, the enclosure is a first enclosure, the opening is a first opening, and the exhaust duct is a first exhaust duct, the battery system further including a second battery, a second exhaust duct extending from a second enclosure of the second battery at a second opening in the second enclosure, and a manifold coupling the first exhaust duct and the second exhaust duct.

Example 24 includes the battery system of any of Examples 20-23, wherein the diaphragm is constructed of polytetrafluoroethylene.

Example 25 is an aircraft. The aircraft includes a propulsor, an electric motor to drive the propulsor to produce thrust, and a battery to supply electrical power to the electric motor. The battery of Example 25 includes an enclosure defining a cavity, the enclosure constructed of nickel-chromium alloy, and a battery cell in the cavity.

Example 26 includes the aircraft of Example 25, wherein the enclosure is hermetically sealed.

Example 27 includes the aircraft of Examples 25 or 26, wherein the enclosure includes a container having an open top, and a lid coupled to the container to define the cavity therein.

Example 28 includes the aircraft of Example 27, wherein the lid is coupled to the container via fasteners.

Example 29 includes the aircraft of Examples 27 or 28, wherein the battery includes a sealant between the lid and a top edge of the container to secure the lid to the top edge of the container.

Example 30 includes the aircraft of any of Examples 25-29, wherein the battery cell is a lithium-ion battery cell.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Additionally, although individual features may be included in different examples or claims, these may possibly be combined, and the inclusion in different examples or claims does not imply that a combination of features is not feasible and/or advantageous.

From the foregoing, it will be appreciated that example methods, systems, apparatus, and articles of manufacture have been disclosed that mitigate a thermal runaway event in a battery. The disclosed methods, systems, apparatus, and articles of manufacture present a durable and lightweight battery enclosure and examples for providing thermal control of a battery and containing a thermal runaway event while addressing the limitations of previous thermal management and containment techniques.

Although certain example methods, systems, apparatus, and articles of manufacture have been disclosed herein, the scope of coverage of this patent is not limited thereto. On the contrary, this patent covers all methods, systems, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A battery comprising:

an enclosure defining a cavity, the enclosure including a first end wall, a second end wall opposite the first end wall, a first sidewall between the first and second end walls, and a second sidewall between the first and second end walls opposite the first sidewall;

a battery cell in the cavity of the enclosure; and a load spreader in the cavity of the enclosure, the load spreader spaced from the first end wall, the battery cell between the load spreader and the second end wall of the enclosure, the load spreader at least partially compressing the battery cell between the load spreader and the second end wall;

a first rib coupled to the first sidewall; and a second rib coupled to the second sidewall opposite the first rib, the load spreader engaged with the first and second ribs, the first and second ribs to maintain the load spreader in a location to at least partially compress the battery cell, wherein the first rib is welded to the first sidewall and the second rib is welded to the second sidewall.

2. The battery of claim 1, further including a plurality of battery cells between the load spreader and the second end wall.

3. The battery of claim 1, further including battery management electronics disposed between the first end wall and the load spreader.

4. The battery of claim 1, wherein the load spreader is a rectangular plate.

5. The battery of claim 1, wherein a first portion of the first rib is curved.

6. The battery of claim 5, wherein a second portion of the first rib is welded to the first sidewall, the first portion of the first rib protruding relative to the first sidewall into the cavity.

7. The battery of claim 6, wherein the second portion of the first rib is spaced apart from the first end wall of the enclosure.

8. A battery comprising:

an enclosure defining a cavity, the enclosure including a first end wall, a second end wall opposite the first end wall, a first sidewall between the first and second end walls, and a second sidewall between the first and second end walls opposite the first sidewall;

a first rib coupled to the first sidewall, the first rib including a curved surface, wherein the first rib includes a first panel extending from a first side of the curved surface and a second panel extending from a second side of the curved surface opposite the first side, the first rib coupled to the first sidewall via the first panel and the second panel;

a second rib coupled to the second sidewall opposite the first rib;

a load spreader in the cavity of the enclosure, a first end of the load spreader engaged with a portion of the first rib and a second end of the load spreader engaged with a portion of the second rib; and a battery cell between the load spreader and the second end wall of the enclosure.

9. The battery of claim 8, wherein the curved surface protrudes relative to the first sidewall into the cavity.

10. The battery of claim 8, wherein the load spreader engages with at least a portion of the second panel of the first rib.

11. The battery of claim 8, wherein the load spreader is spaced apart from the first end wall of the enclosure.

12. The battery of claim 11, further including:

a bus bar in the cavity; and a bus bar connector coupled to the bus bar and to the first end wall of the enclosure.

13. A battery comprising:

an enclosure having a first interior surface and a second interior surface opposite the first interior surface, the enclosure defining a cavity;

a first rib having a first rib portion and a second rib portion, the first rib portion coupled to the first interior surface, the second rib portion protruding relative to the first rib portion into the cavity;

a second rib coupled to the second interior surface;

a battery cell in the cavity; and a load spreader engaged with the first rib portion of the first rib and engaged with the second rib, the first rib and the second rib to maintain the load spreader in a position to exert a compression force on the battery cell.

14. The battery of claim 13, wherein the second rib portion has a curved shape.

15. The battery of claim 13, wherein the first rib portion extends from a first side of the second rib portion, and wherein the first rib includes a third rib portion extending from a second side of the second rib portion opposite the first side, the second rib portion protruding relative to the third rib portion.

16. The battery of claim 15, wherein the first rib is coupled to the first interior surface via the first rib portion and the third rib portion.

17. The battery of claim 13, wherein the enclosure has a first end wall and a second end wall, the first interior surface and the second interior surface extending between the first end wall and the second end wall, the first rib and the second rib proximate to the first end wall, the battery cell compressed between the load spreader and the second end wall.

18. The battery of claim 17, wherein a portion of the first interior surface extends between the first rib and the first end wall.

19. The battery of claim 13, wherein the first rib includes nickel-chromium alloy or stainless steel.

20. The battery of claim 13, wherein the second rib includes a third rib portion and fourth rib portion, the third rib portion protruding relative to the fourth rib portion into the cavity.

* * * * *